United States Patent
Yoo et al.

(10) Patent No.: US 10,321,155 B2
(45) Date of Patent: Jun. 11, 2019

(54) VIDEO ENCODING AND DECODING METHODS AND APPARATUSES FOR PADDING AREA OF IMAGE

(71) Applicant: SAMSUNG ELECTRONICS CO., LTD., Suwon-si (KR)

(72) Inventors: Ki-won Yoo, Seoul (KR); Jae-moon Kim, Uiwang-si (KR); Sang-kwon Na, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 15/321,988

(22) PCT Filed: Jun. 26, 2015

(86) PCT No.: PCT/KR2015/006522
§ 371 (c)(1),
(2) Date: Dec. 23, 2016

(87) PCT Pub. No.: WO2015/199478
PCT Pub. Date: Dec. 30, 2015

(65) Prior Publication Data
US 2017/0155922 A1 Jun. 1, 2017

(30) Foreign Application Priority Data
Jun. 27, 2014 (KR) .................. 10-2014-0079951

(51) Int. Cl.
*H04N 19/59* (2014.01)
*H04N 19/172* (2014.01)
(Continued)

(52) U.S. Cl.
CPC ........... *H04N 19/59* (2014.11); *H04N 19/119* (2014.11); *H04N 19/157* (2014.11); *H04N 19/172* (2014.11); *H04N 19/96* (2014.11)

(58) Field of Classification Search
CPC ...... H04N 19/59; H04N 19/119; H04N 19/96; H04N 19/157; H04N 19/172
(Continued)

(56) References Cited

U.S. PATENT DOCUMENTS 6,256,417 B1 * 7/2001 Takahashi ............ H04N 19/563
375/E7.212
8,548,052 B2 10/2013 Alshina et al.
(Continued)

FOREIGN PATENT DOCUMENTS

JP 2010-226672 A 10/2010
KR 10-2011-0047697 A 5/2011
(Continued)

OTHER PUBLICATIONS

Lei et al, Padding block based DVC coding scheme with mutual bi-directional frame coding at decoder (Year: 2012).*
(Continued)

*Primary Examiner* — Shan E Elahi
(74) *Attorney, Agent, or Firm* — Sughrue Mion, PLLC

(57) ABSTRACT

Provided is a video encoding method including: performing padding outside an input image such that a size of the input image is a multiple of a maximum coding unit; when a current maximum coding unit includes a padding area generated via the padding, determining a coding unit by splitting the current maximum coding unit by using a boundary of the input image and the padding area; determining information indicating whether a coding unit included in the padding area includes a nonzero coefficient to be 0; and encoding a bitstream including the determined information.

15 Claims, 20 Drawing Sheets

(51) Int. Cl.
*H04N 19/119* (2014.01)
*H04N 19/96* (2014.01)
*H04N 19/157* (2014.01)

(58) Field of Classification Search
USPC .................................................. 375/240.13
See application file for complete search history.

(56) References Cited

U.S. PATENT DOCUMENTS

| | | | |
|---|---|---|---|
| 9,264,708 B2 | 2/2016 | Cheon | |
| 9,883,180 B2* | 1/2018 | MacInnis | H04N 19/46 |
| 2003/0117416 A1 | 6/2003 | Danielsen et al. | |
| 2006/0268982 A1* | 11/2006 | Lee | H04N 19/563 375/240.03 |
| 2011/0202695 A1 | 8/2011 | Nandan et al. | |
| 2012/0082216 A1 | 4/2012 | Wang et al. | |
| 2012/0082238 A1 | 4/2012 | Panusopone et al. | |
| 2012/0314767 A1 | 12/2012 | Wang et al. | |
| 2012/0320970 A1* | 12/2012 | Drugeon | H04N 19/563 375/240.02 |
| 2013/0003855 A1 | 1/2013 | Park et al. | |
| 2013/0022115 A1* | 1/2013 | Oh | H04N 19/122 375/240.12 |
| 2013/0330012 A1* | 12/2013 | Sato | H04N 19/61 382/233 |
| 2014/0153646 A1* | 6/2014 | Yang | H04N 19/176 375/240.12 |
| 2014/0168362 A1* | 6/2014 | Hannuksela | H04N 13/161 348/43 |
| 2014/0301445 A1* | 10/2014 | Sasai | H04N 19/13 375/240.02 |

FOREIGN PATENT DOCUMENTS

| | | |
|---|---|---|
| KR | 10-2011-0065090 A | 6/2011 |
| KR | 10-2012-0126078 A | 11/2012 |
| KR | 10-2013-0070646 A | 6/2013 |
| WO | 2011/053050 A2 | 5/2011 |

OTHER PUBLICATIONS

Communication dated Jan. 5, 2018, from the European Patent Office in counterpart European Application No. 15811954.5.

ByeongMoon Jeon et al., "Description of video coding technology proposal by LG Electronics", Joint Collaborative Team on Video Coding (JCT-VC) of ITU-T SG16 WP3 and ISO/IEC JTC1/SC29/WG11, 1st Meeting: Dresden, DE, Apr. 15-23, 2010 Document: JCTVC-A110, (37 Pages Total).

Chih-Ming Fu et al., "Sample Adaptive Offset with Padding at LCU, Slice, and Image Boundaries", Joint Collaborative Team on Video Coding (JCT-VC) of ITU-T SG16 WP3 and ISO/IEC JTC1/SC29/WG11, 6th Meeting: Torino, IT, Jul. 14-22, 2011 Document: JCTVC-F093, (7 Pages Total).

Chia-Yang Tsai et al., "AHG6: ALF with modified padding process", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012 Document: JCTVC-J0050, (11 Pages Total).

Chia-Yang Tsai et al., "Slice Boundary Processing and Picture Layer Raw Byte Sequence Payload", Joint Collaborative Team on Video Coding (JCT-VC) of ITU-T SG16 WP3 and ISO/IEC JTC1/SC29/VVG11, 4th Meeting: Daegu, KR, Jan. 20-28, 2011 Document: JCTVC-D128, (14 Pages Total).

Ming Li, et al., "Rate-Distortion Criterion Based Picture Padding for Arbitrary Resolution Video Coding Using H.264/MPEG-4 AVC", IEEE Transactions on Circuits and Systems for Video Technology, vol. 20, No. 9, Sep. 2010, pp. 1233-1241.

International Search Report (PCT/ISA/210) and Written Opinion (PCT/ISA/237) dated Sep. 8, 2015 issued by the International Searching Authority in counterpart International Application No. PCT/KR2015/006522.

Communication dated Jun. 30, 2016, issued by the Korean Intellectual Property Office in counterpart Korean application No. 10-2014-0079951.

* cited by examiner

[Fig. 1A]
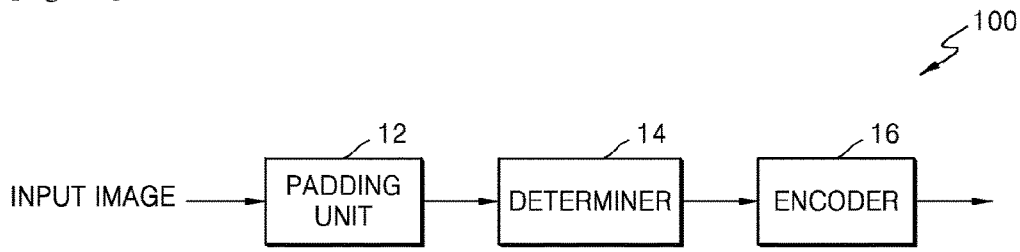
[Fig. 1B]
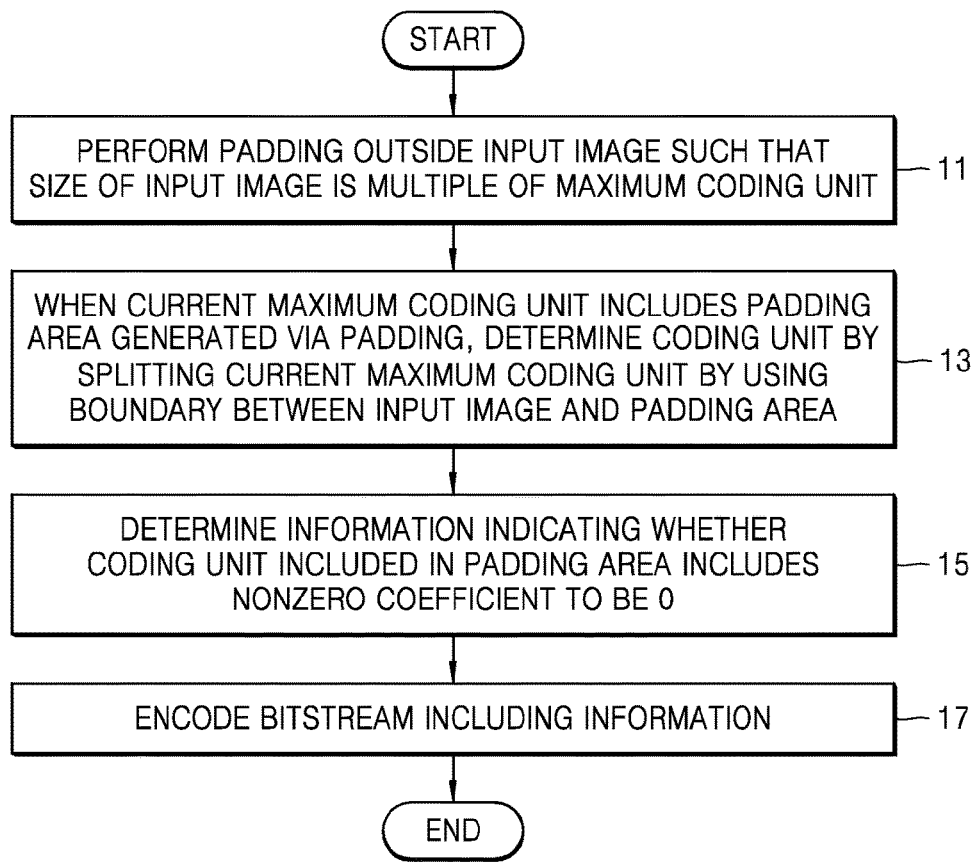
[Fig. 2A]
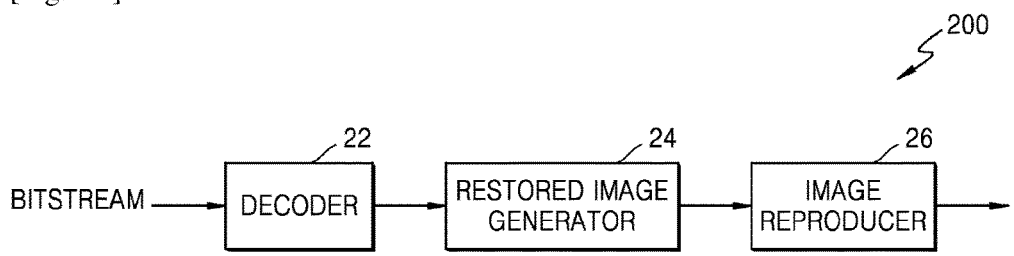

[Fig. 2B]
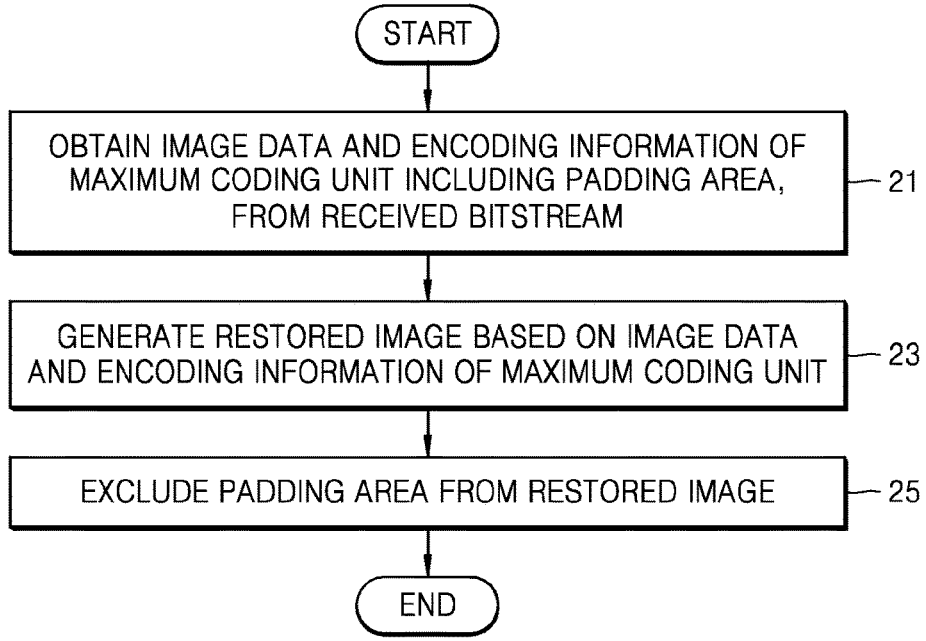
[Fig. 3A]
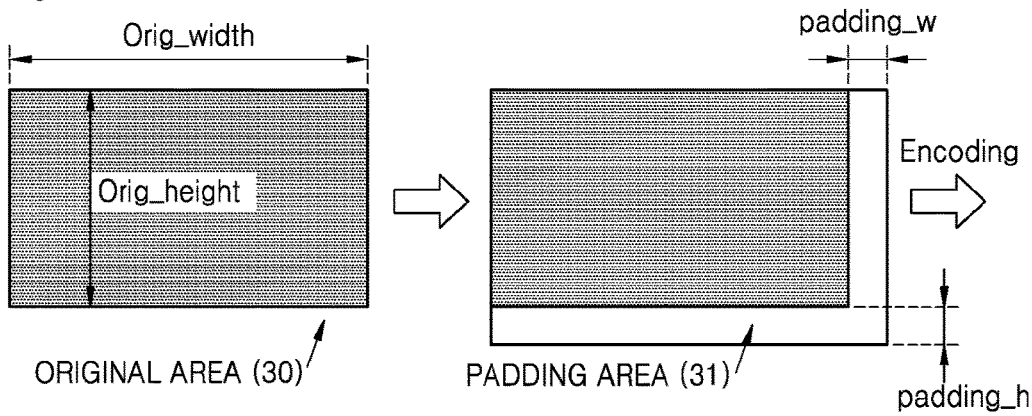
[Fig. 3B]
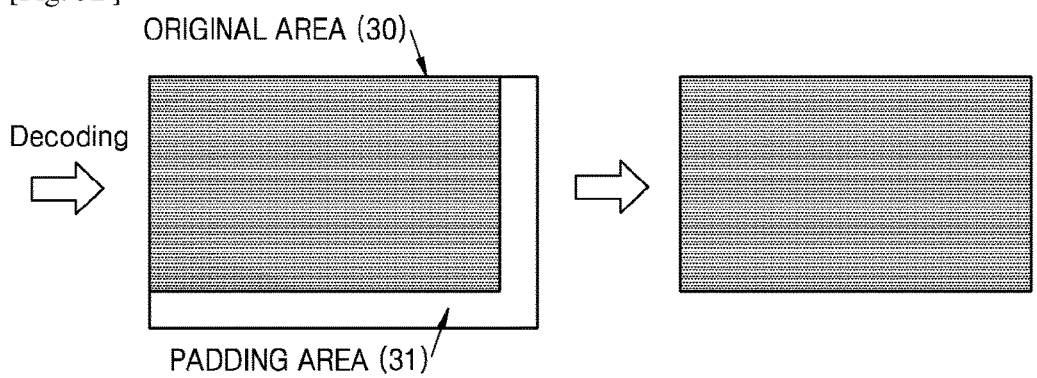

[Fig. 4]
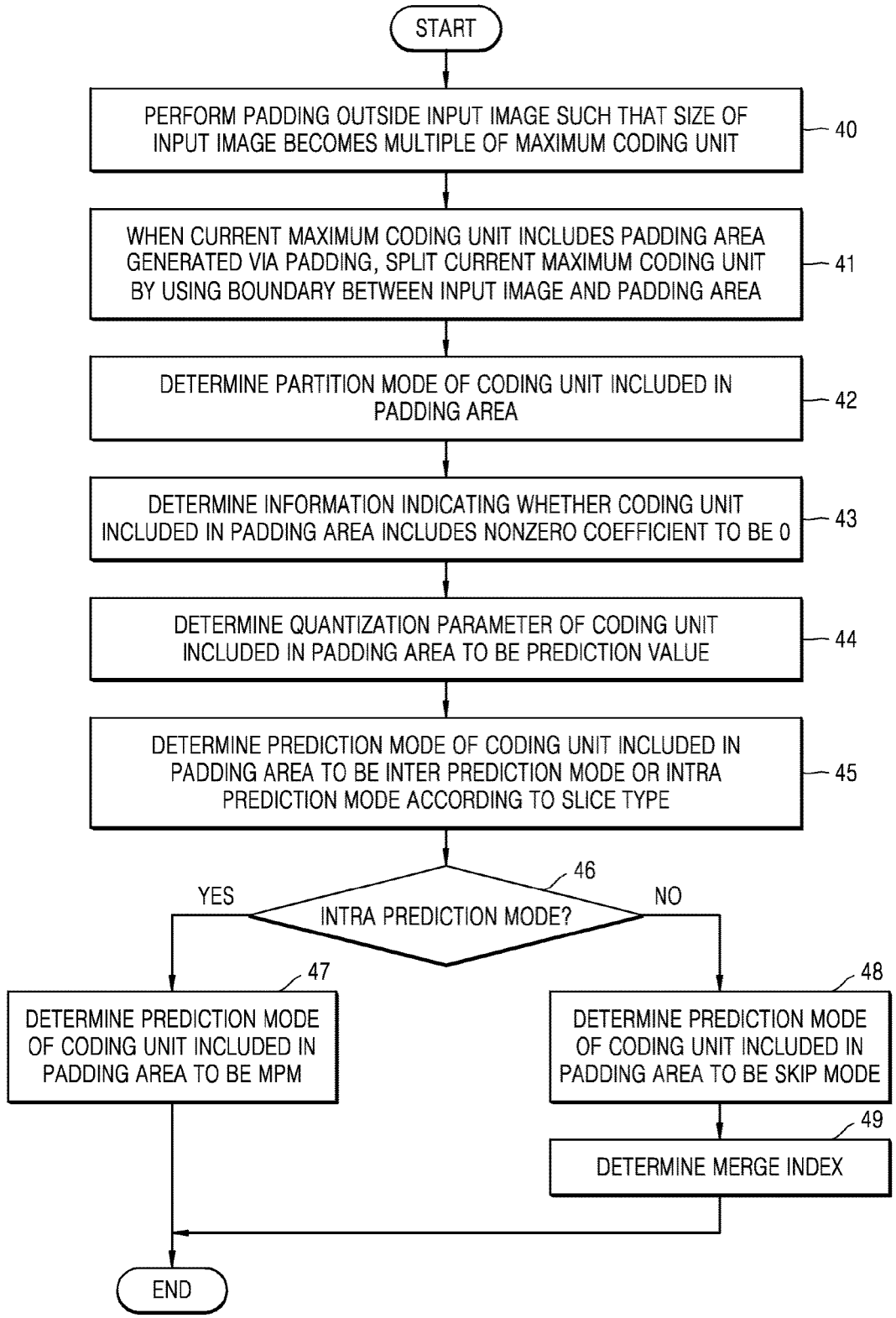

[Fig. 5]
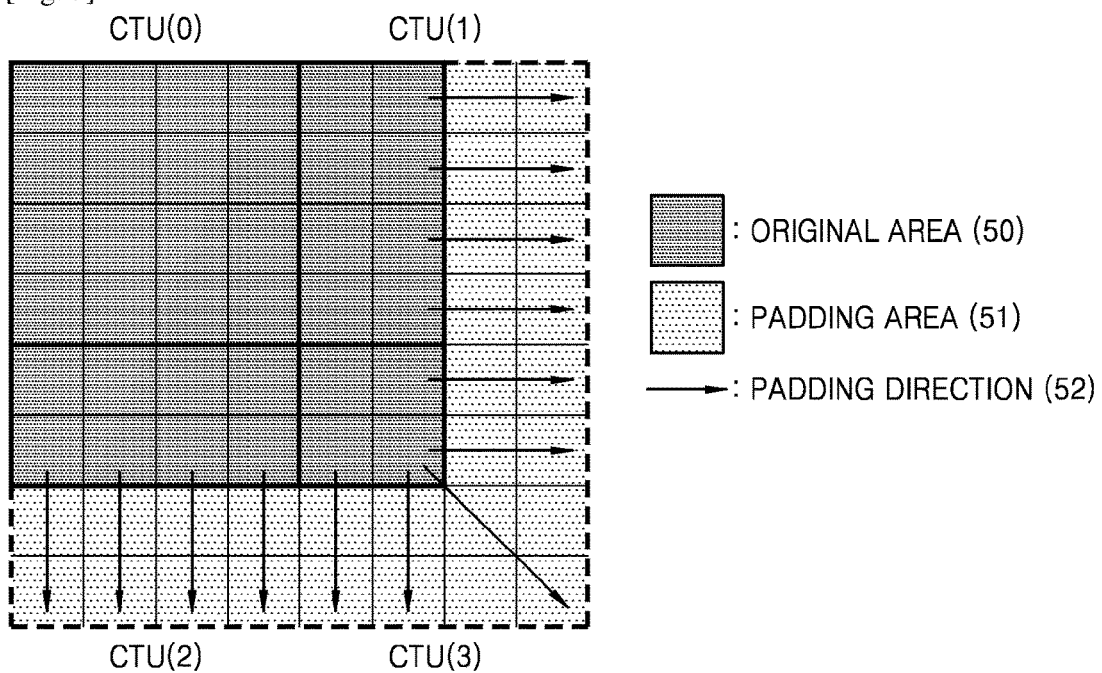
[Fig. 6]
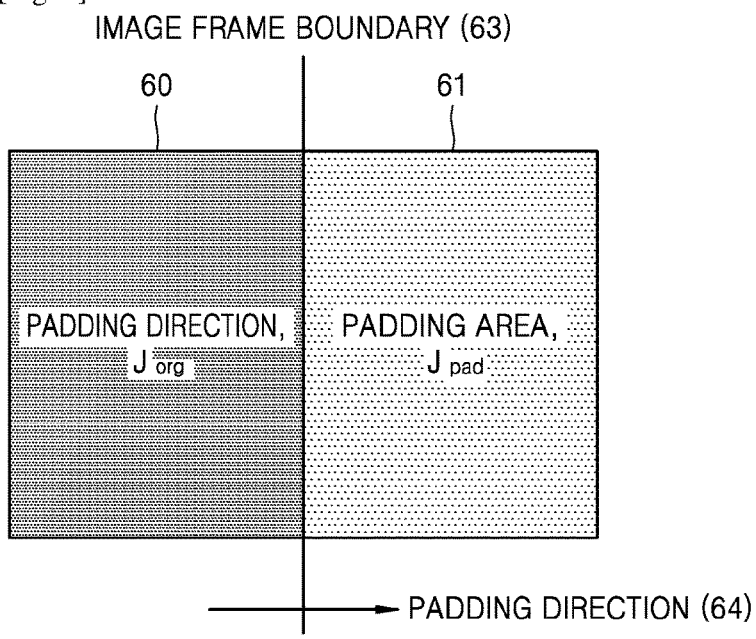

[Fig. 7]
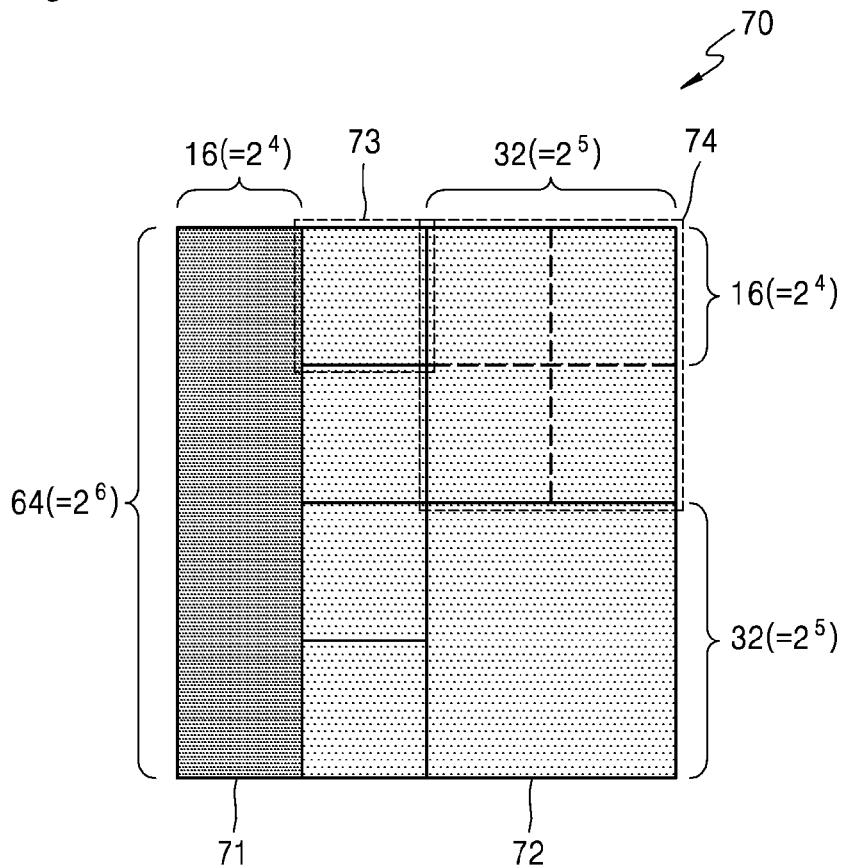
[Fig. 8]
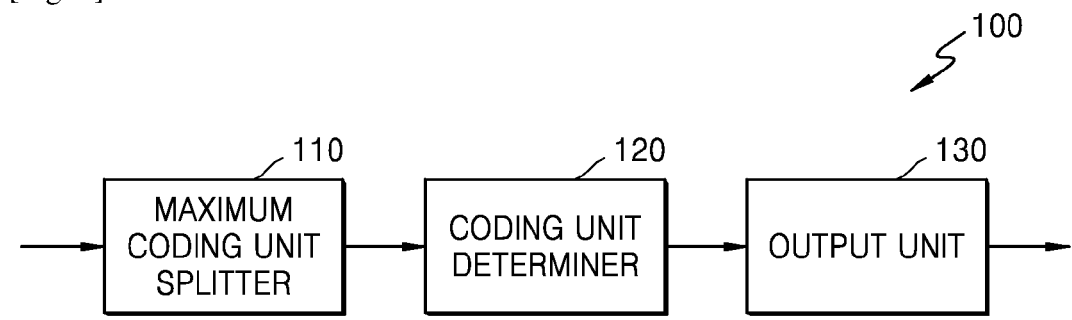
[Fig. 9]
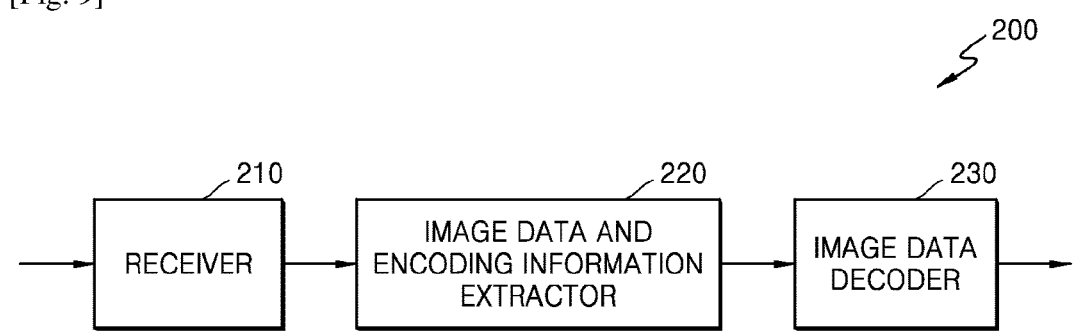

[Fig. 10]
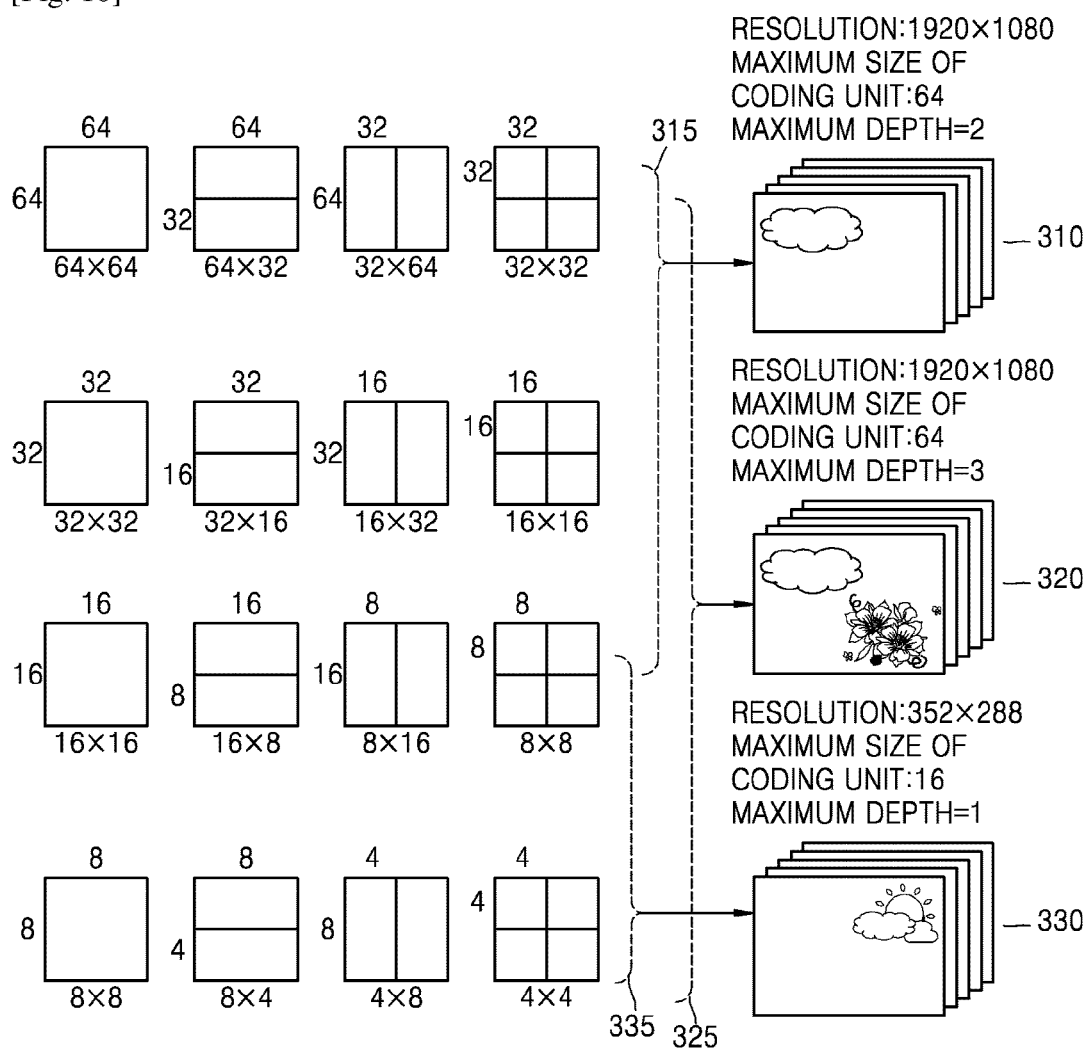

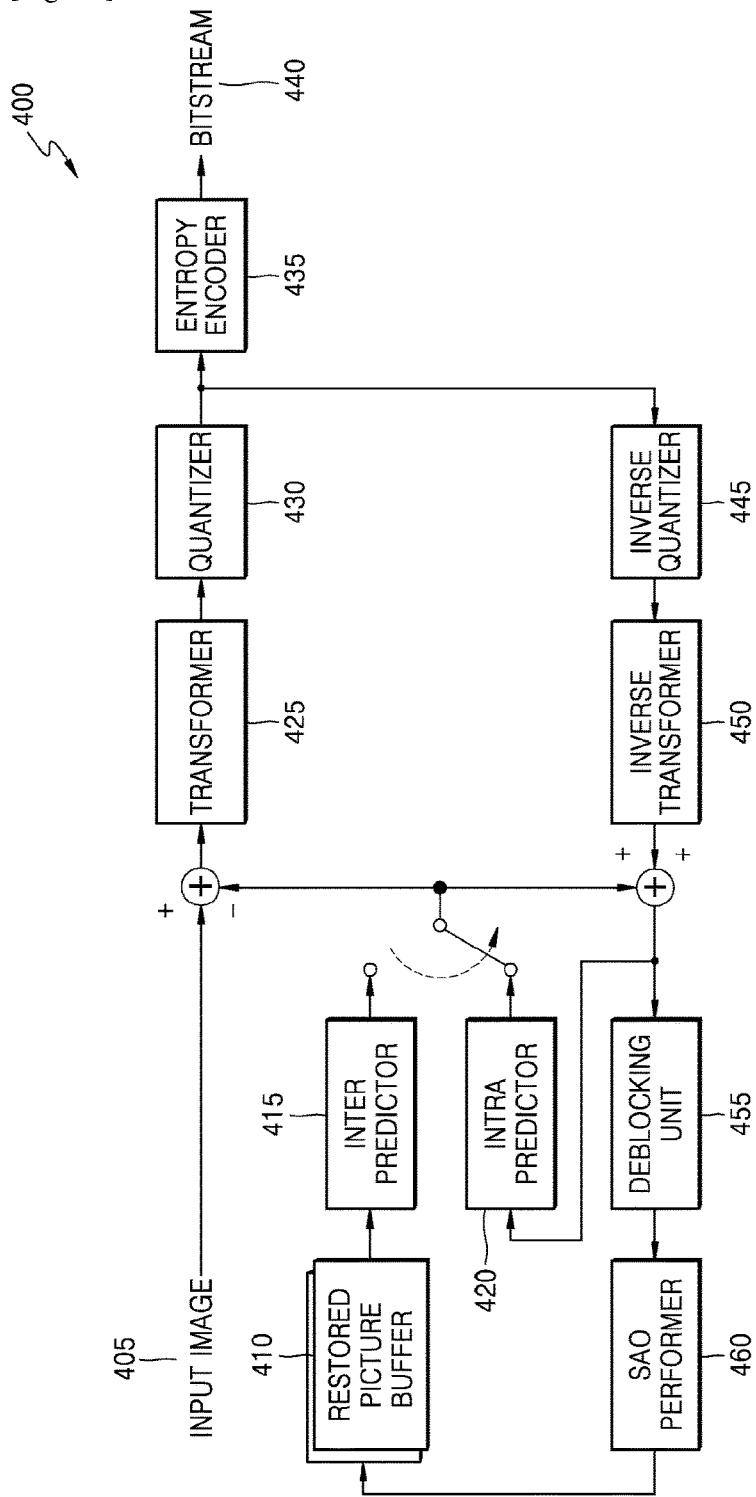
[Fig. 11]

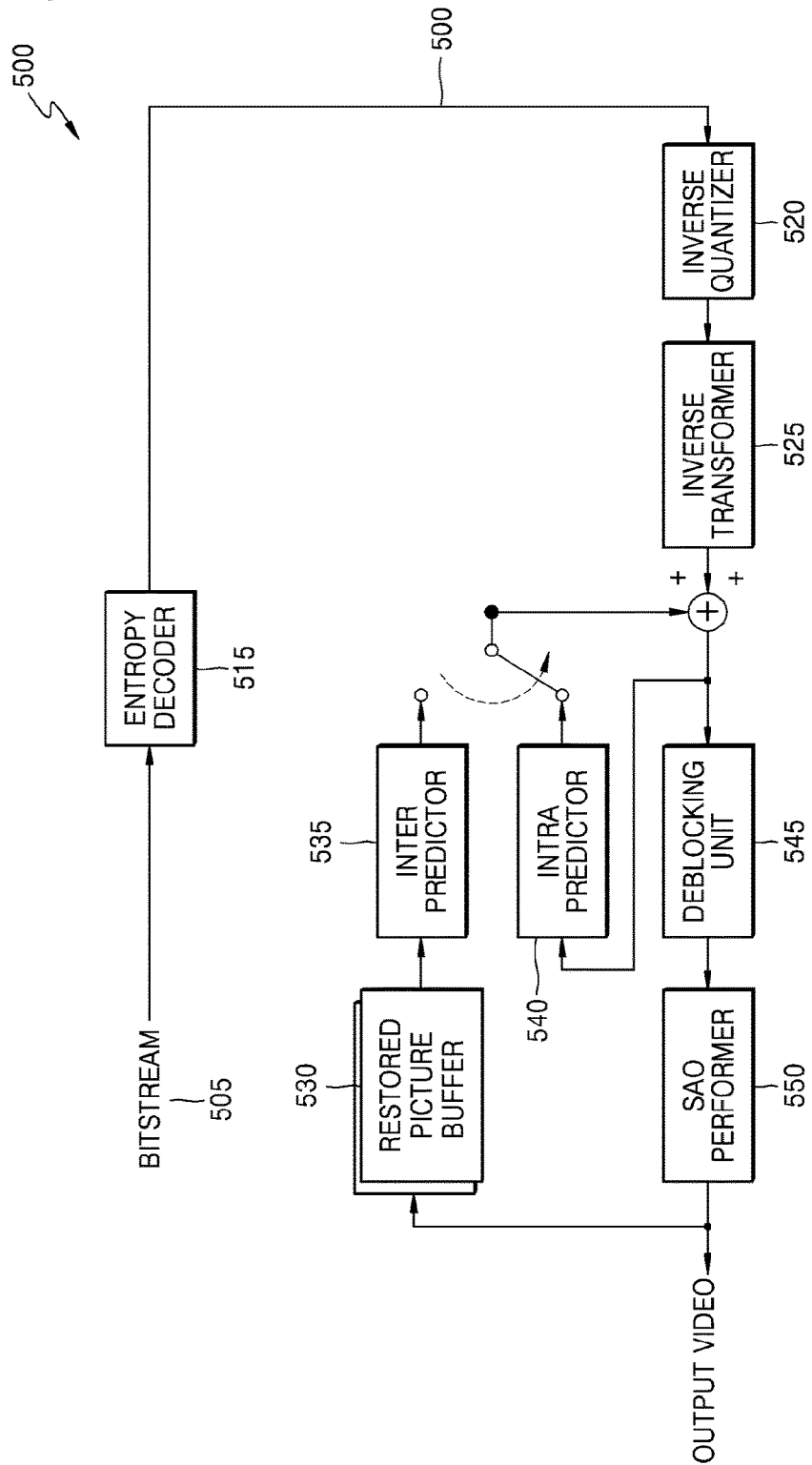
[Fig. 12]

[Fig. 13]
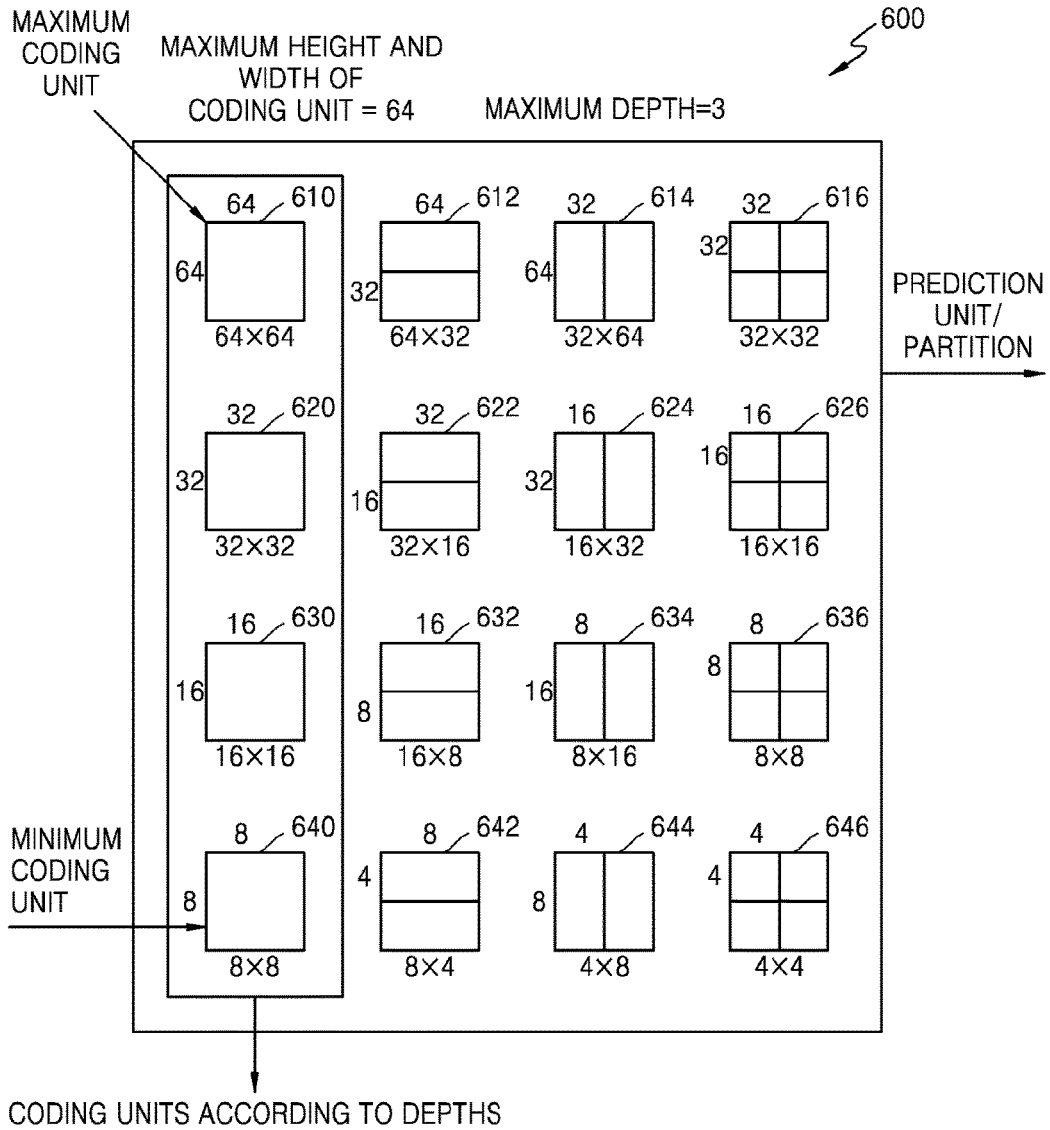
CODING UNITS ACCORDING TO DEPTHS
[Fig. 14]
CODING UNIT (710)        TRANSFORMATION UNIT (720)
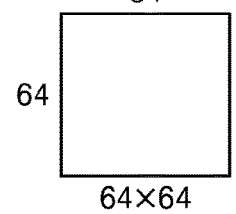 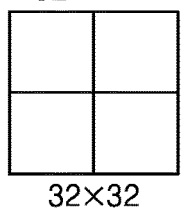

[Fig. 15]
INFORMATION ABOUT PARTITION TYPE (800)
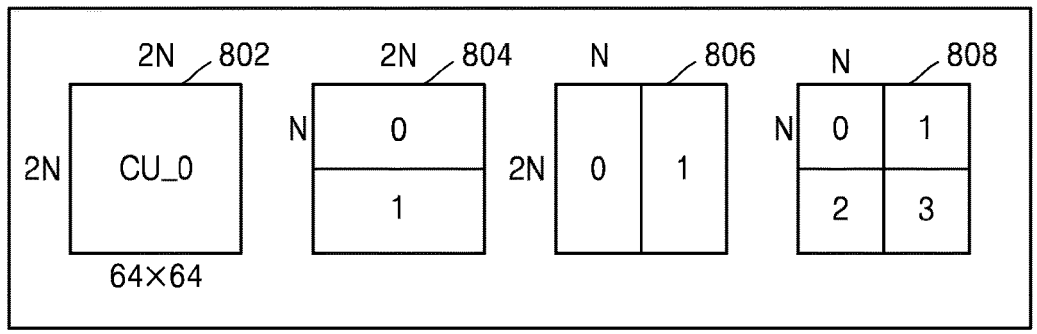
INFORMATION ABOUT PREDICTION MODE (810)
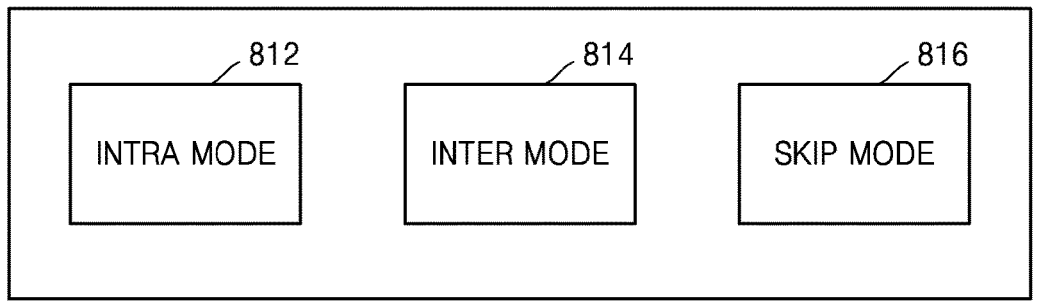
INFORMATION ABOUT SIZE OF TRANSFORMATION UNIT (820)
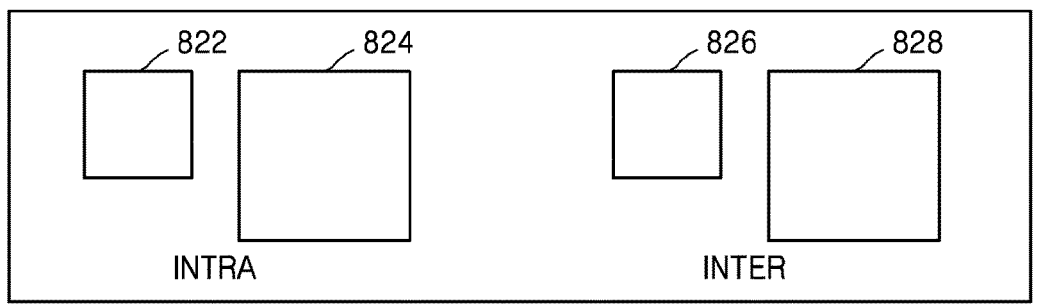

[Fig. 16]
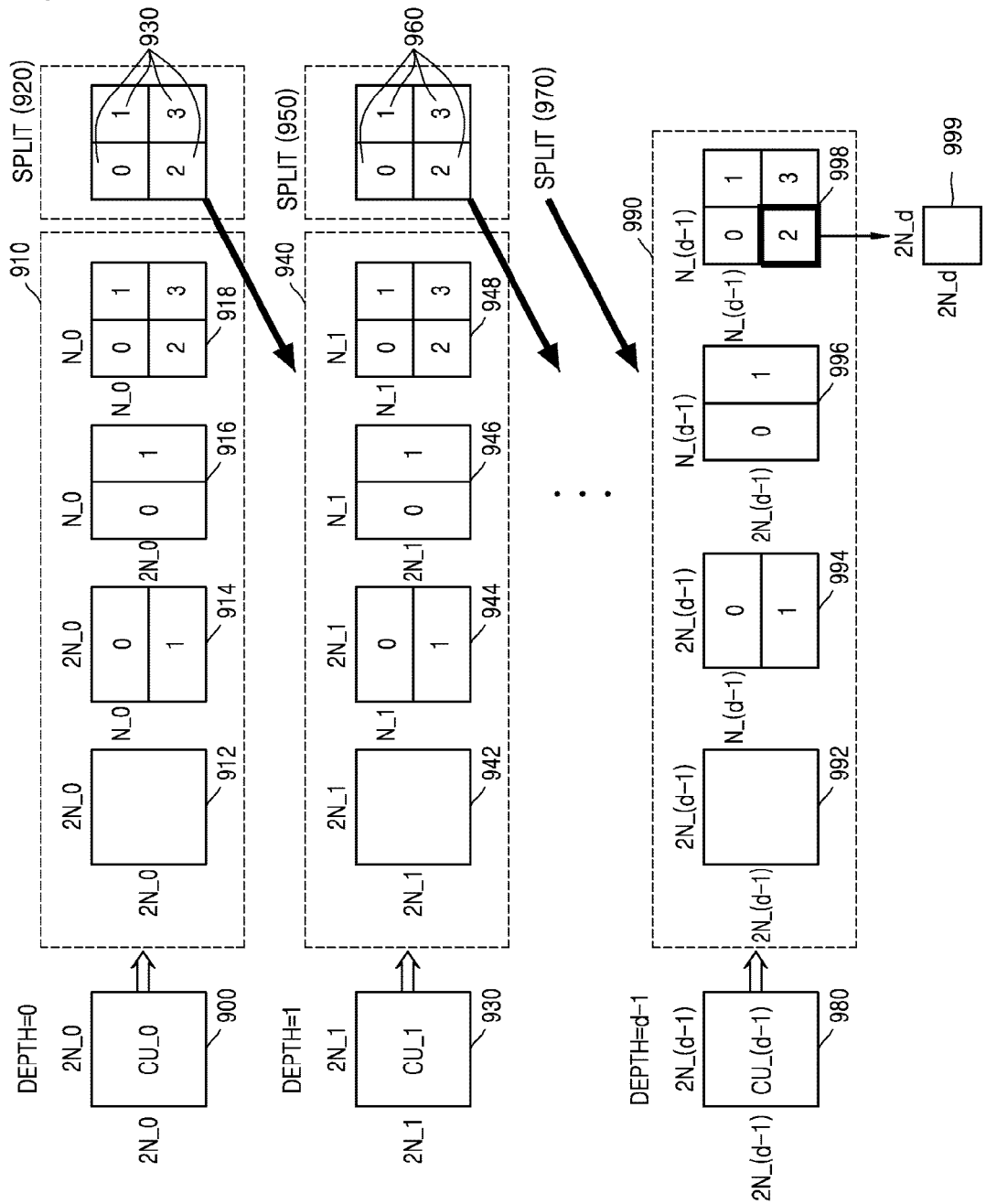

[Fig. 17]
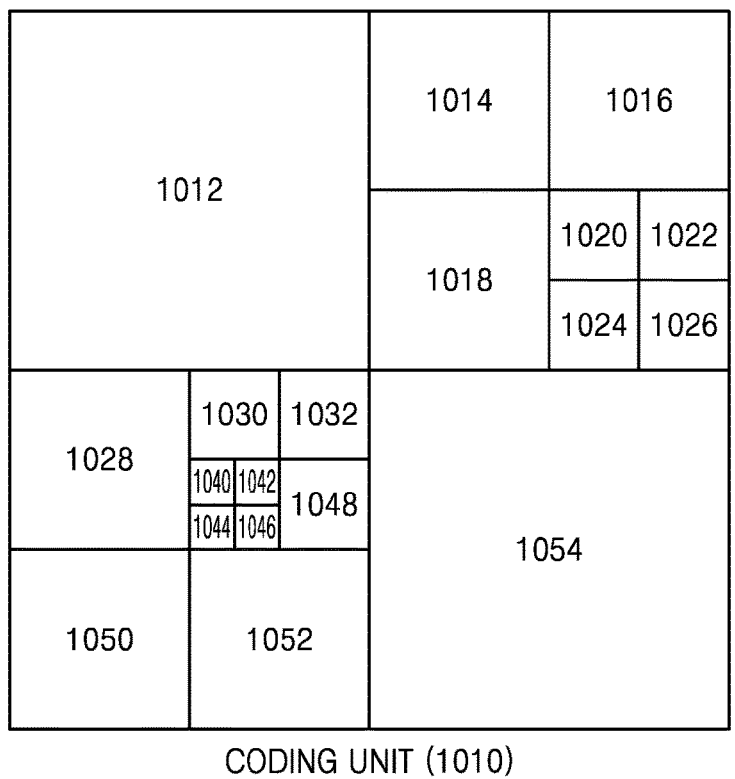
CODING UNIT (1010)
[Fig. 18]
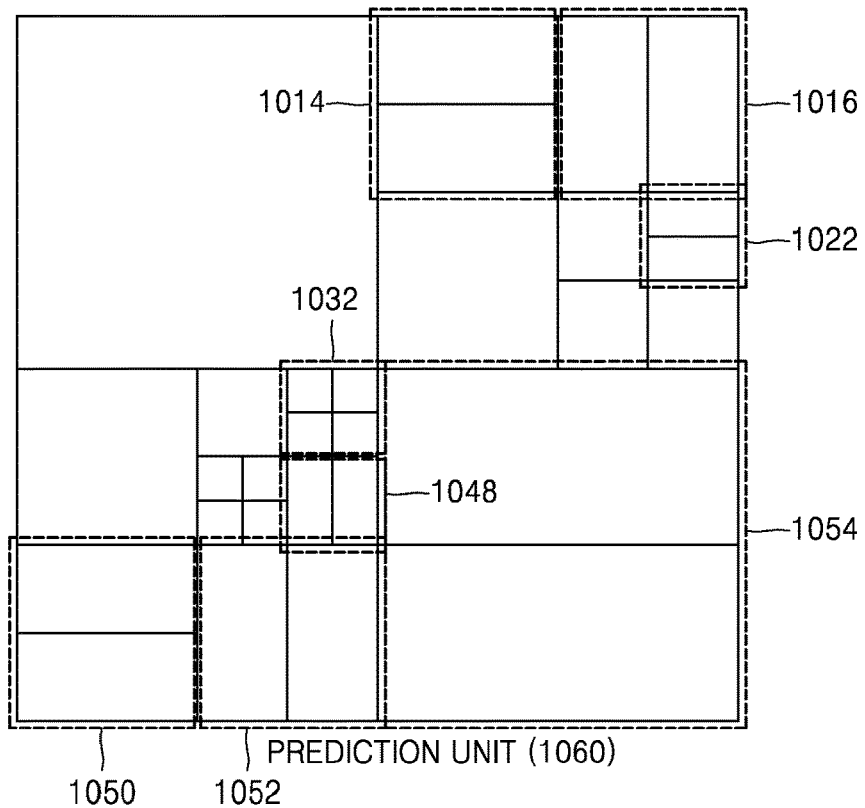
PREDICTION UNIT (1060)

[Fig. 19]
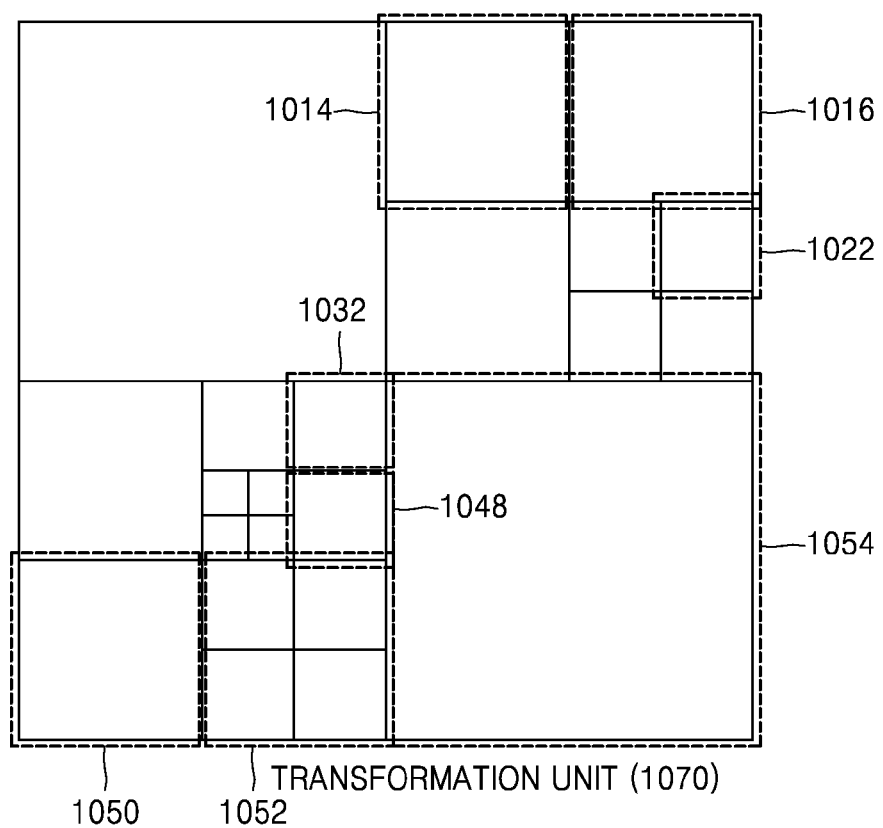

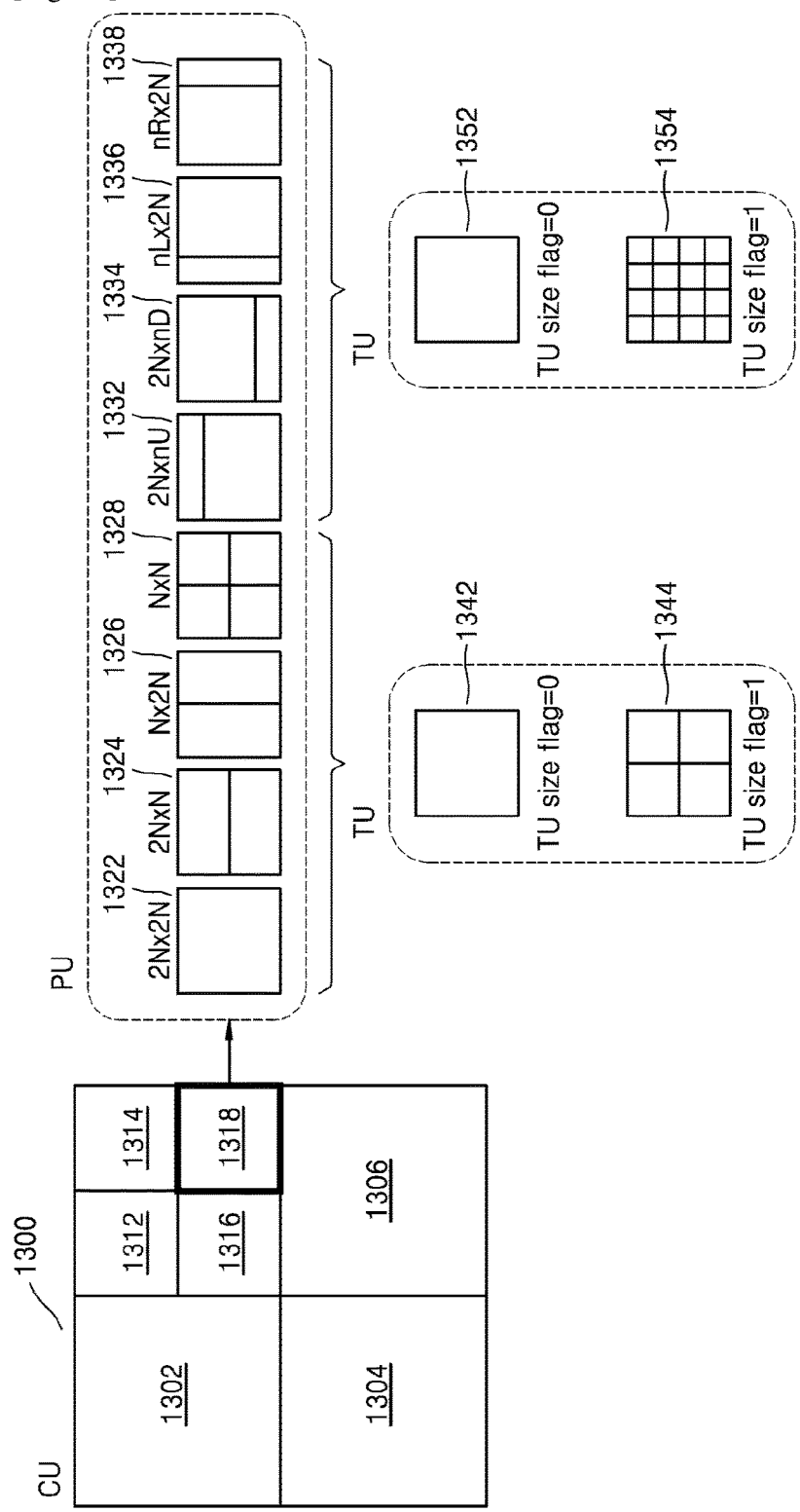

[Fig. 21]
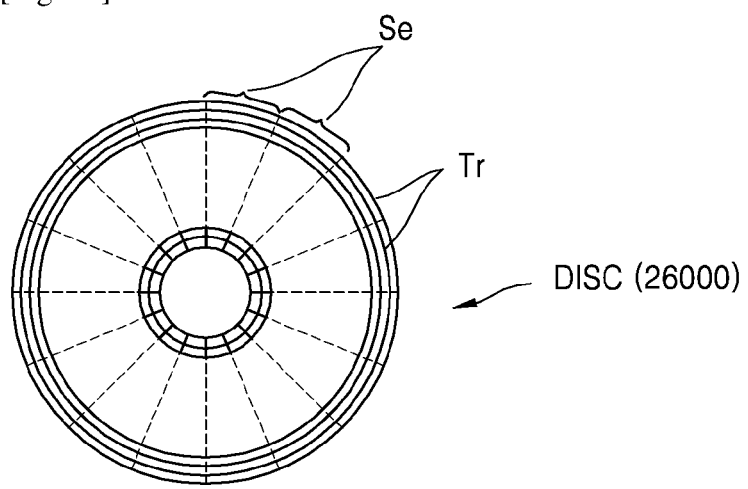
[Fig. 22]
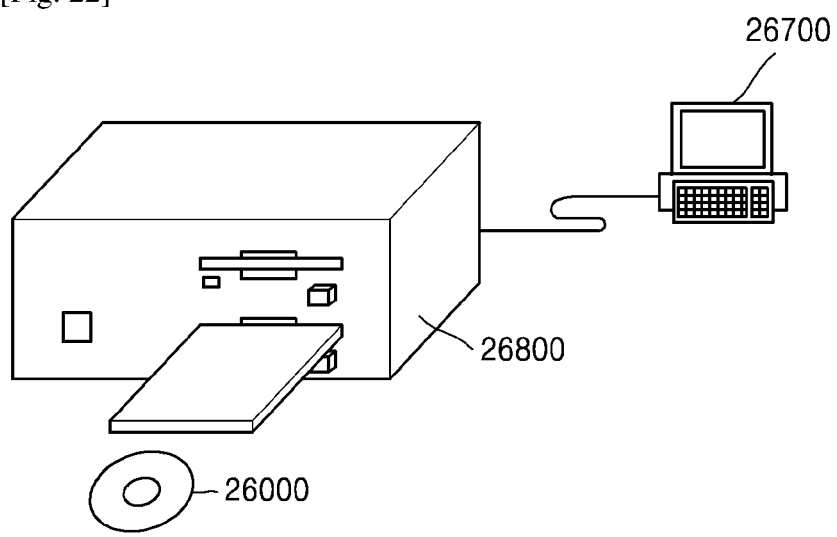

[Fig. 23]
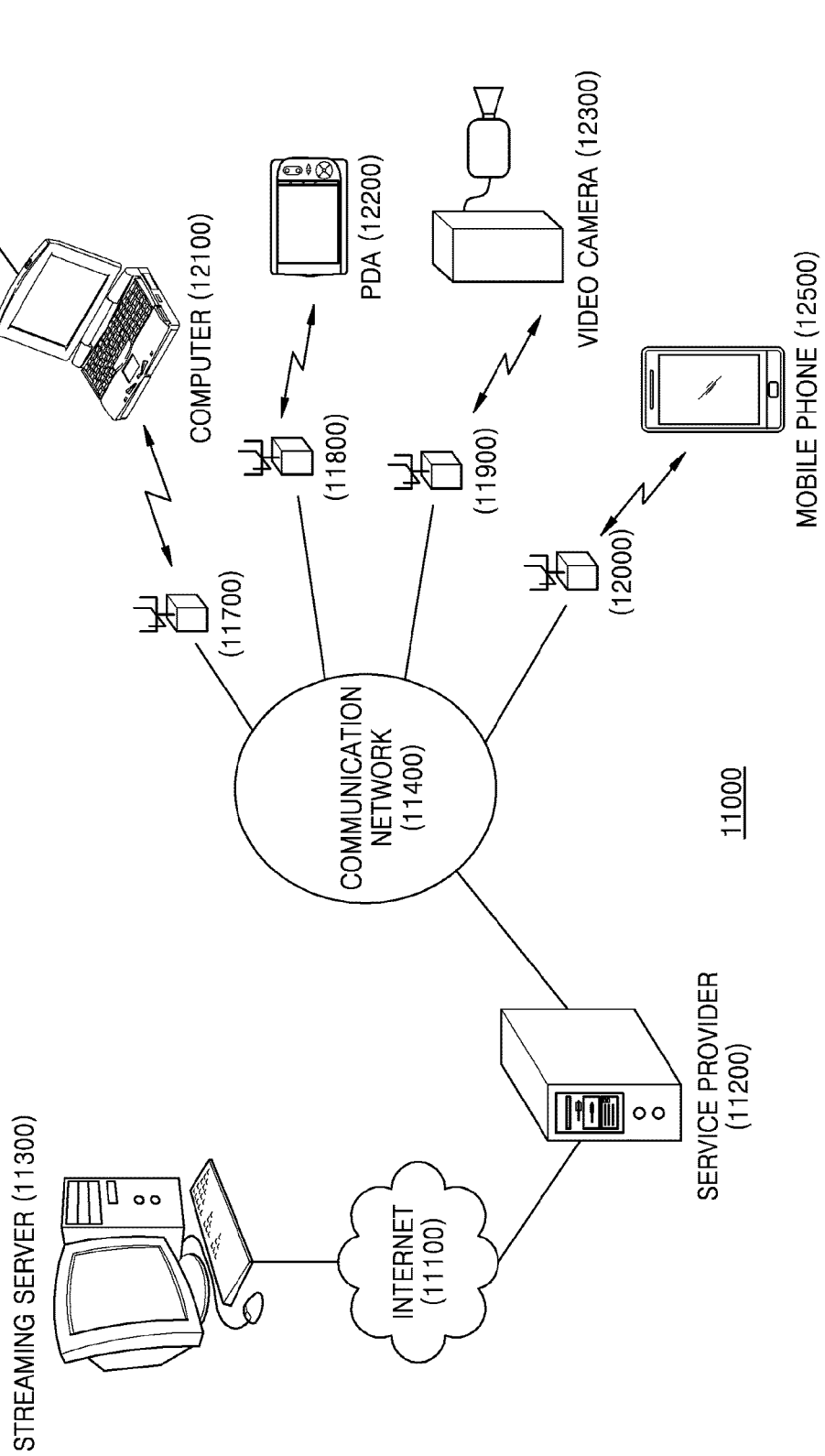

[Fig. 24]
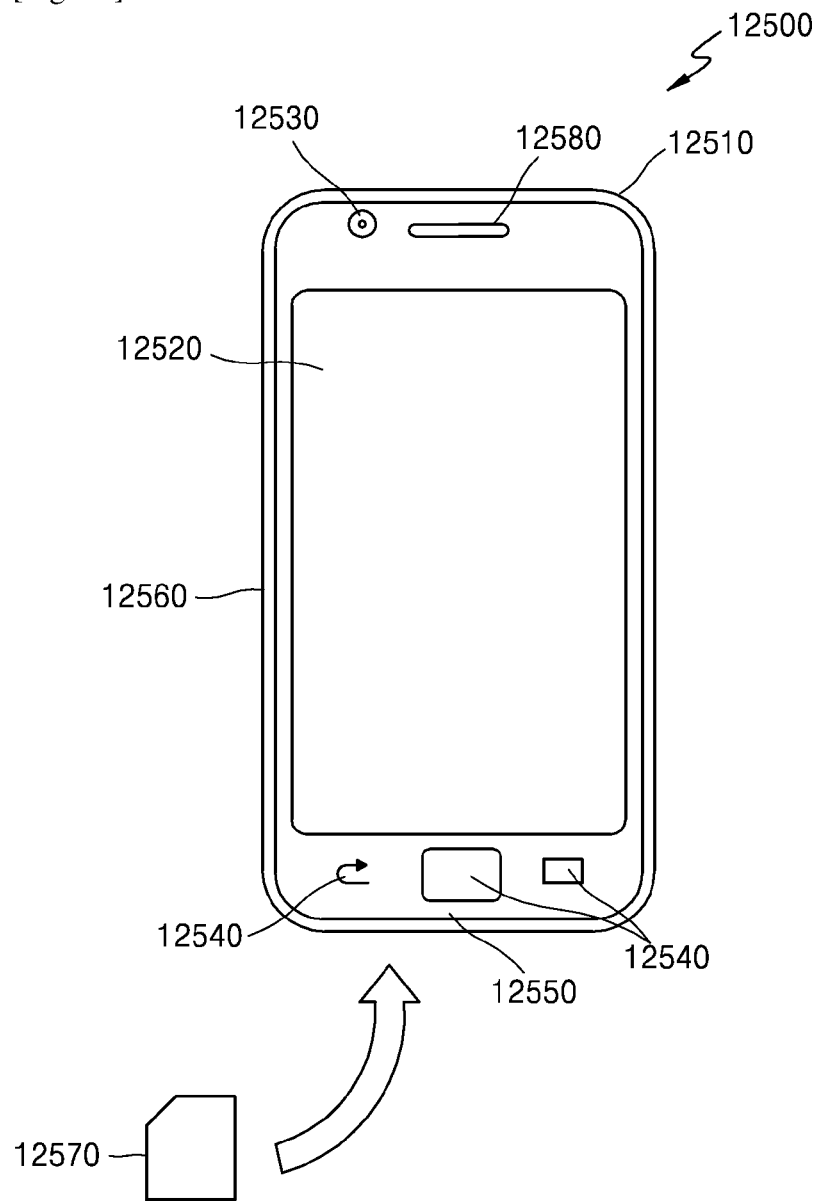

[Fig. 25]
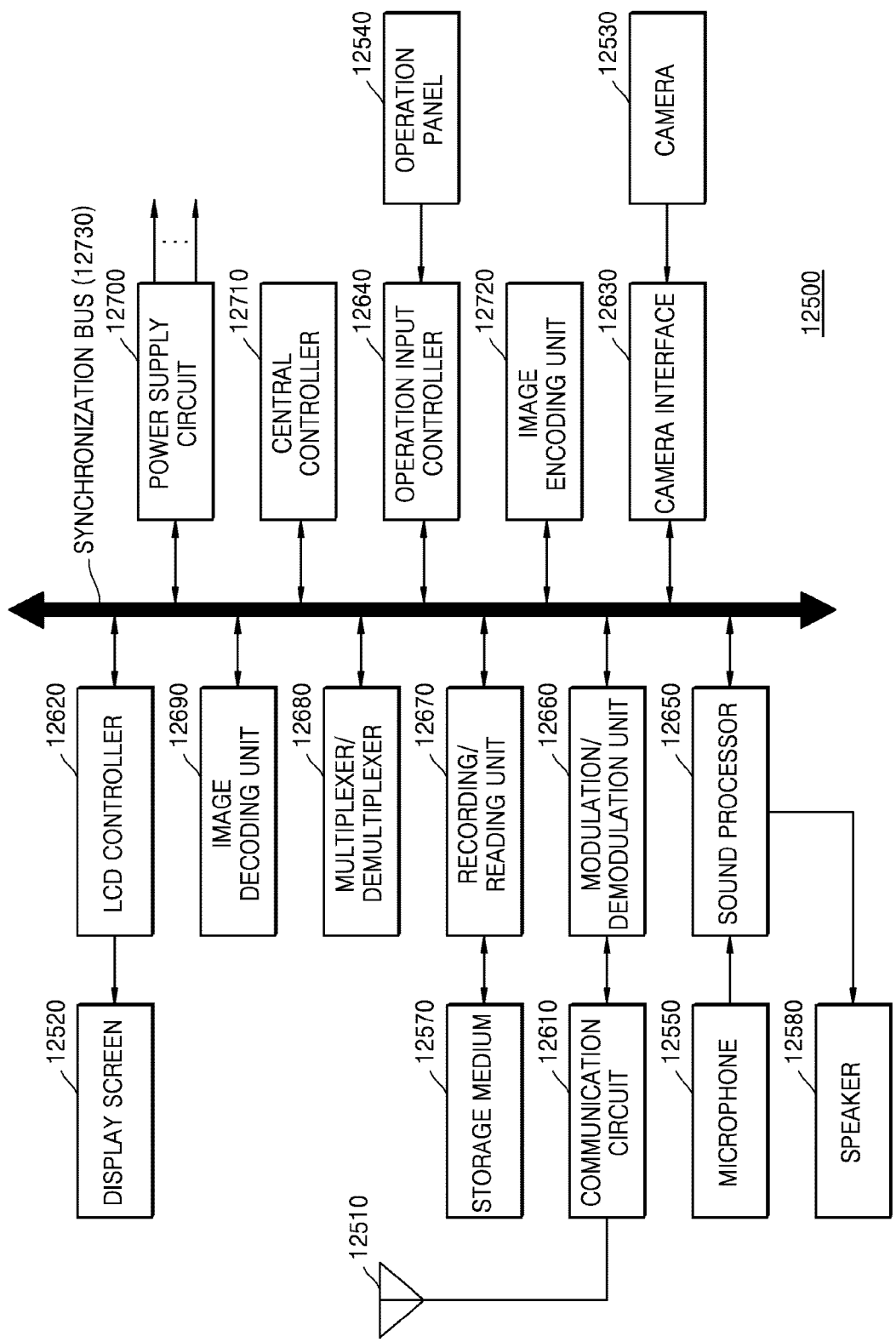

[Fig. 26]
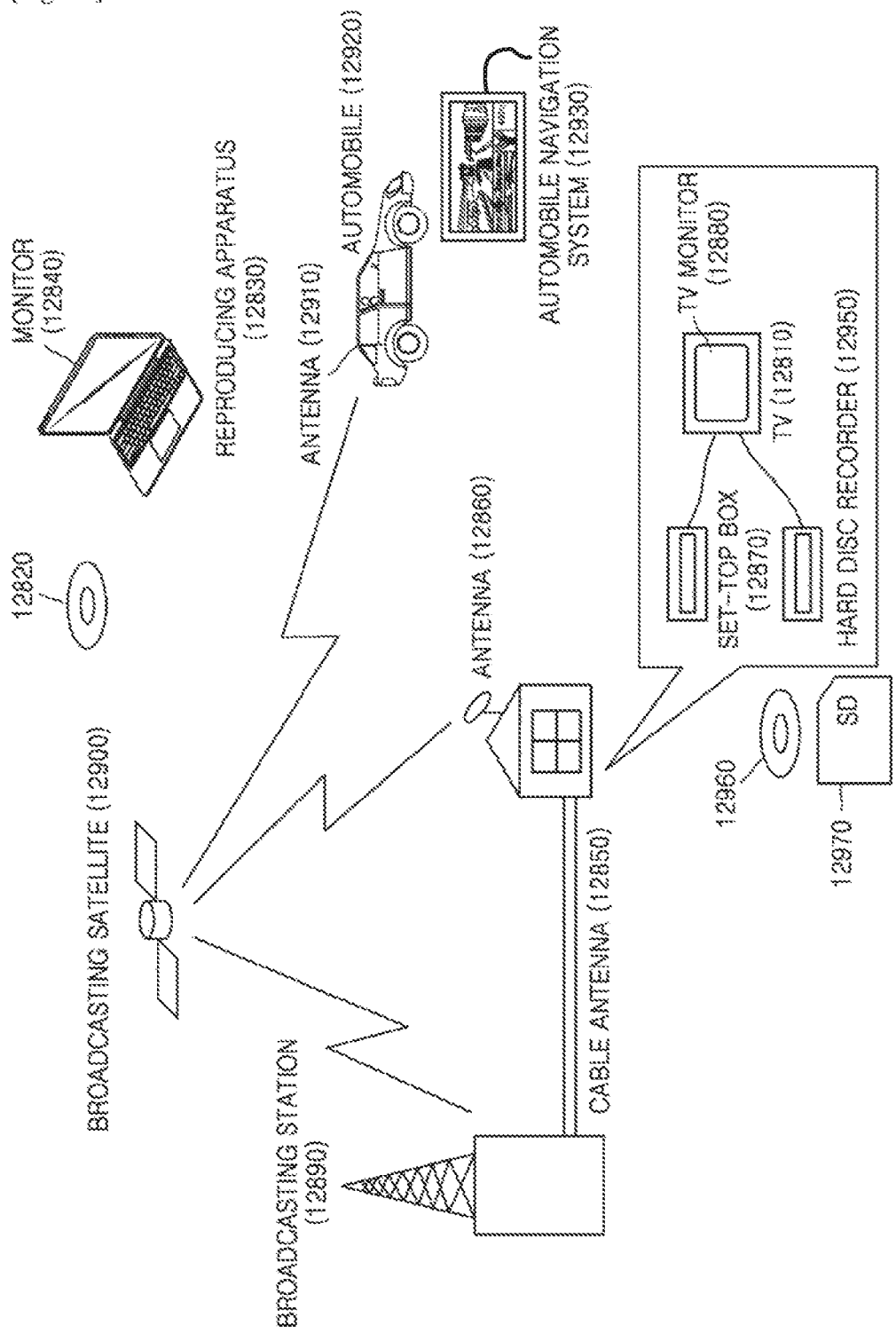

[Fig. 27]
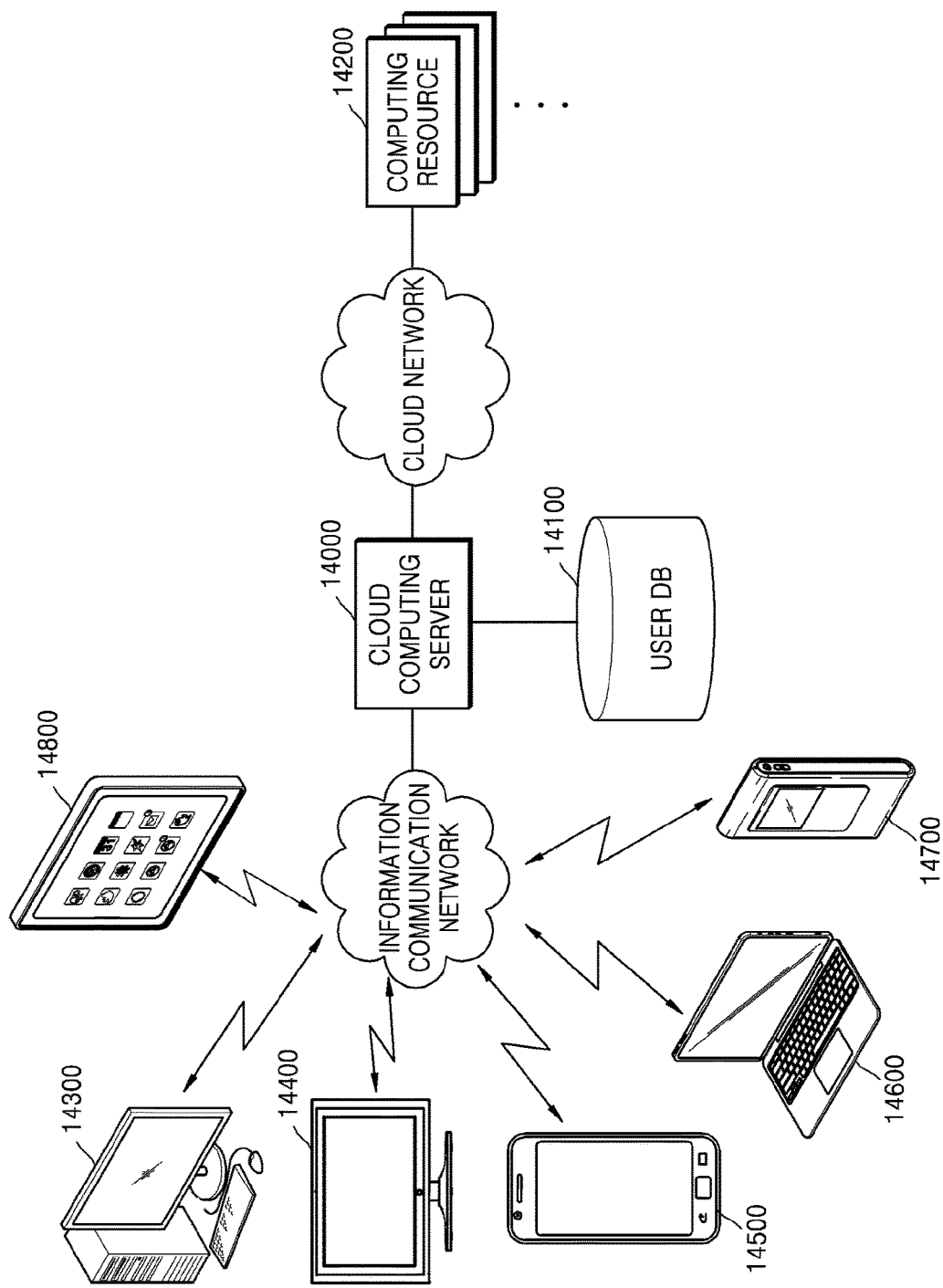

VIDEO ENCODING AND DECODING METHODS AND APPARATUSES FOR PADDING AREA OF IMAGE

TECHNICAL FIELD

One or more exemplary embodiments relate to video encoding and decoding methods and apparatuses for a padding area of an image, and more particularly, to methods and apparatuses for increasing video encoding and decoding efficiencies of a padding area of an image.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial domain is transformed into coefficients of a frequency region via frequency transformation. According to a video codec, an image is split into blocks having a predetermined size, discrete cosine transformation (DCT) is performed for each respective block, and frequency coefficients are encoded in block units, for rapid calculation of frequency transformation. Compared with image data of a spatial domain, coefficients of a frequency region are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

Also, as hardware for reproducing and storing video contents of various resolutions is being developed and supplied, an image may be processed via padding if a size of the image does not match a multiple of a basic processing unit.

DISCLOSURE OF INVENTION

Solution to Problem a video encoding method includes: performing padding outside an input image such that a size of the input image is a multiple of a maximum coding unit; when a current maximum coding unit includes a padding area generated via the padding, determining a coding unit by splitting the current maximum coding unit by using a boundary of the input image and the padding area; determining information indicating whether a coding unit included in the padding area has a nonzero coefficient to be 0; and encoding a bitstream including the determined information.

Advantageous Effects of Invention a video encoding method includes: performing padding outside an input image such that a size of the input image is a multiple of a maximum coding unit; when a current maximum coding unit includes a padding area generated via the padding, determining a coding unit by splitting the current maximum coding unit by using a boundary of the input image and the padding area; determining information indicating whether a coding unit included in the padding area has a nonzero coefficient to be 0; and encoding a bitstream including the determined information.

BRIEF DESCRIPTION OF DRAWINGS

These and/or other aspects will become apparent and more readily appreciated from the following description of the exemplary embodiments, taken in conjunction with the accompanying drawings in which:

FIG. 1A is a block diagram of a video encoding apparatus according to some embodiments;

FIG. 1B is a flowchart of a video encoding method according to some embodiments;

FIG. 2A is a block diagram of a video decoding apparatus according to some embodiments;

FIG. 2B is a flowchart of a video decoding method according to some embodiments;

FIGS. 3A and 3B illustrate examples of methods of encoding and decoding an image including a padding area, according to some embodiments;

FIG. 4 is a flowchart for describing a method of encoding an image, wherein an encoding mode is enforced on a padding area, according to some embodiments;

FIG. 5 illustrates an example of performing padding outside an image, according to some embodiments;

FIG. 6 illustrates an example of splitting a maximum coding unit by using a boundary between an input image and a padding area, according to some embodiments;

FIG. 7 illustrates an example of determining a partition mode of a coding unit included in a padding area, according to some embodiments;

FIG. 8 is a block diagram of a video encoding apparatus based on a coding unit according to a tree structure, according to some embodiments;

FIG. 9 is a block diagram of a video decoding apparatus based on a coding unit according to a tree structure, according to some embodiment;

FIG. 10 is a diagram for describing a concept of coding units according to some embodiments;

FIG. 11 is a block diagram of an image encoder based on coding units according to some embodiments;

FIG. 12 is a block diagram of an image decoder based on coding units according to some embodiments;

FIG. 13 is a diagram illustrating deeper coding units according to depths, and partitions according to some embodiments;

FIG. 14 is a diagram for describing a relationship between a coding unit and transformation units, according to some embodiments;

FIG. 15 is a diagram for describing encoding information of coding units corresponding to a coded depth, according to some embodiments;

FIG. 16 is a diagram of deeper coding units according to depths, according to some embodiments;

FIGS. 17 through 19 are diagrams for describing a relationship between coding units, prediction units, and transformation units, according to some embodiments;

FIG. 20 is a diagram for describing a relationship between a coding unit, a prediction unit, and a transformation unit, according to encoding mode information of Table 1;

FIG. 21 illustrates a physical structure of a disc that stores a program, according to some embodiments;

FIG. 22 illustrates a disc drive that records and reads a program by using a disc;

FIG. 23 illustrates an entire structure of a content supply system that provides content distribution service;

FIGS. 24 and 25 illustrate external and internal structures of a mobile phone to which a video encoding method and a video decoding method are applied, according to some embodiments;

FIG. 26 illustrates a digital broadcasting system employing a communication system, according to some embodiments; and FIG. 27 illustrates a network structure of a cloud computing system using a video encoding apparatus and a video decoding apparatus, according to some embodiments.

BEST MODE FOR CARRYING OUT THE INVENTION

One or more exemplary embodiments include video encoding and decoding methods for increasing compression efficiency by enforcing an encoding mode while encoding a padding area included in an image.

Additional aspects will be set forth in part in the description which follows and, in part, will be apparent from the description, or may be learned by practice of the presented exemplary embodiments.

According to one or more exemplary embodiments, a video encoding method includes: performing padding outside an input image such that a size of the input image is a multiple of a maximum coding unit; when a current maximum coding unit includes a padding area generated via the padding, determining a coding unit by splitting the current maximum coding unit by using a boundary of the input image and the padding area; determining information indicating whether a coding unit included in the padding area has a nonzero coefficient to be 0; and encoding a bitstream including the determined information.

The determining of the coding unit may include determining a partition mode such that the coding unit included in the padding area is no longer split.

The video encoding method may further include determining a quantization parameter of the coding unit included in the padding area to be a prediction value.

The video encoding method may further include determining a prediction mode of the coding unit included in the padding area according to a slice type.

The determining of the prediction mode may include determining the prediction mode from among a certain number of prediction mode candidates.

The determining of the prediction mode may include determining the prediction mode to be a skip mode.

The determining of the prediction mode may include determining a merge index of the coding unit included in the padding area to be an index indicating a padding direction.

The determining of the prediction mode may include determining a merge index of the coding unit included in the padding area to be an index having a lowest value from among indexes respectively indicating merge candidate blocks.

The video encoding method may further include, when the determined coding unit comprises a part of the input image and a part of the padding area, determining information indicating whether a transformation unit comprising the part of the padding area has a nonzero coefficient to be 0.

The video encoding method may further include, when the determined coding unit includes the part of the input image and the part of the padding area, determining a prediction mode of a prediction unit including the part of the padding area from among prediction units included in the determined coding unit, according to a slice type.

According to one or more exemplary embodiments, a video decoding method includes: obtaining image data and encoding information of a maximum coding unit including a padding area, from a received bitstream; generating a restored image based on the image data and the encoding information of the maximum coding unit; and excluding a padding area from the restored image, wherein information indicating whether a coding unit included in the padding area from among coding units included in the maximum coding unit has a nonzero coefficient is 0.

The generating of the restored image comprises determining a quantization parameter of the coding unit included in the padding area from among the coding units included in the maximum coding unit to be a prediction value.

The obtaining of the image data and the encoding information may include obtaining information about the padding area, and the excluding of the padding area may include determining an image obtained by excluding the padding area from the restored image based on the information about the padding area to be a reproduction image.

The generating of the restored image may include predicting the coding unit included in the padding area according to a prediction mode determined from among a certain number of prediction mode candidates.

The generating of the restored image may include performing prediction of the coding unit included in the padding area in a skip mode.

The generating of the restored image may include predicting the coding unit included in the padding area according to a merge index indicating a padding direction of the padding area.

The generating of the restored image may include predicting the coding unit included in the padding area according to a merge index determined to be an index having a lowest value from among indexes respectively indicating merge candidate blocks.

According to one or more exemplary embodiments, a video encoding apparatus includes: a padding unit configured to perform padding outside an input image such that a size of the input image is a multiple of a maximum coding unit; a determiner configured to, when a current maximum coding unit includes a padding area generated via the padding, determine a coding unit by splitting the current maximum coding unit by using a boundary of the input image and the padding area, and determine information indicating whether a coding unit included in the padding area has a nonzero coefficient to be 0; and an encoder configured to encode a bitstream including the determined information.

According to one or more exemplary embodiments, a video decoding apparatus includes: a decoder configured to obtain image data and encoding information of a maximum coding unit including a padding area, from a received bitstream; a restored image generator configured to generate a restored image based on the image data and the encoding information of the maximum coding unit; and an image reproducer configured to exclude a padding area from the restored image, wherein information indicating whether a coding unit included in the padding area from among coding units included in the maximum coding unit has a nonzero coefficient is 0.

According to one or more exemplary embodiments, a non-transitory computer-readable recording medium has recorded thereon a program, which when executed by a computer, performs the video encoding method or the video decoding method.

Mode For The Invention

Hereinafter, a video encoding technique and an inter-layer video decoding technique efficiently including a padding area of an image are suggested with reference to FIGS. 1A through 7. Also, a video encoding technique and a video decoding technique based on coding units having a tree structure according to some embodiments, which are applicable to the video encoding technique and the inter-layer video decoding technique suggested above will be described with reference to FIGS. 8 through 20. Also, various embodiments to which a video encoding method and a video decoding method are applicable will be described with reference to FIGS. 21 through 27.

Hereinafter, an 'image' may denote a still image or a moving image of a video, or a video itself.

Hereinafter, a 'sample' denotes data that is assigned to a sampling location of an image and is to be processed. For example, pixels of an image in a spatial domain may be samples.

As used herein, the term "and/or" includes any and all combinations of one or more of the associated listed items. Expressions such as "at least one of," when preceding a list of elements, modify the entire list of elements and do not modify the individual elements of the list.

First, video encoding and decoding methods having high compression efficiency by enforcing an encoding mode while encoding a padding area included in an image according to embodiments will be described with reference to FIGS. 1A through 7.

FIG. 1A is a block diagram of a video encoding apparatus 100 according to some embodiments.

The video encoding apparatus 100 according to some embodiments may include a padding unit 12, a determiner 14, and an encoder 16. Also, the video encoding apparatus 100 according to some embodiments may include a central processor (not shown) that generally controls the padding unit 12, the determiner 14, and the encoder 16. Alternatively, the padding unit 12, the determiner 14, and the encoder 16 may be operated by individual processors (not sown), and the video encoding apparatus 100 may generally operate as the individual processors mutually systematically operate. Alternatively, the padding unit 12, the determiner 14, and the encoder 16 may be controlled by an external processor (not shown) outside the video encoding apparatus 100.

The video encoding apparatus 100 may include at least one data storage unit (not shown) for storing input/output data of the padding unit 12, the determiner 14, and the encoder 16. The video encoding apparatus 100 may include a memory controller (not shown) that manages data input and output of the data storage unit.

The video encoding apparatus 100 may perform a video encoding operation including transformation by interworking with an internal video encoding processor or an external video encoding processor in order to output a video encoding result. The internal video encoding processor of the video encoding apparatus 100 may realize a video encoding operation as a separate processor. Also, the video encoding apparatus 100, a central processing apparatus, or a graphic processing apparatus may realize a basic video encoding operation by including a video encoding processing module.

Operations of the video encoding apparatus 100 according to some embodiments will now be described in detail with reference to FIG. 1B.

FIG. 1B is a flowchart of a video encoding method according to some embodiments.

In operation 11, the padding unit 12 may perform padding outside an input image such that a size of the input image is a multiple of a maximum coding unit. Here, the maximum coding unit includes coding units having a tree structure, and may be alternatively referred to as a coding tree unit, a coding block tree, a block tree, a root block tree, a coding tree, a coding root, or a tree trunk. The coding units may be determined by splitting the maximum coding unit, and the coding unit may include a prediction unit and a transformation unit.

Meanwhile, the video encoding apparatus 100 may be designed as a finite state machine (FSM) to process the maximum coding unit having a fixed size. In this case, designs may be simplified and loads may be reduced, and in addition, verification issues may be reduced. However, in an FSM method, an input image may be unable to be processed if a size of the input image is not a multiple of a maximum coding unit.

Accordingly, the padding unit 12 according to some embodiments may perform the padding outside the input image such that the size of the input image is a multiple of the maximum coding unit, thereby processing an image having any one of various sizes. For example, the padding may be performed by filling outside the input image with a value of an adjacent block such that the size of the input image is a multiple of the maximum coding unit. Here, information about whether the padding is performed on the input image and a size of the padding area may be transmitted to a video decoding apparatus 200 via a sequence parameter set (SPS).

Meanwhile, if the video encoding apparatus 100 encodes an image on which padding is performed, a data amount to be processed may increase, and thus coding performance may be decreased. Accordingly, the video encoding apparatus 100 according to some embodiments may distinguish an original image area and a padding area, and enforce an encoding mode of the padding area to increase coding performance. In addition, a rate overhead may be reduced.

In operation 13, when a current maximum coding unit includes a padding area generated via the padding, the determiner 14 may split the current maximum coding unit by using a boundary between the input image and the padding area to determine a coding unit. For example, the determiner 14 may split the current coding unit into a coding unit included in the input image and a coding unit included in the padding area based on the boundary between the input image and the padding area.

Also, the determiner 14 may determine a partition mode such that the coding unit included in the padding area is no longer split because a throughput of a prediction unit may be high when the number of coding units having a tree structure, which are included in the padding area, is high, thereby increasing a rate generated in the padding area. Here, the rate denotes a data generation rate per unit time.

An example of the video encoding apparatus 100 determining a coding unit by splitting a maximum coding unit by using a boundary of a padding area will be described in detail later with reference to FIGS. 6 and 7.

If the padding area included in the maximum coding unit is not a multiple of a minimum coding unit, the coding unit obtained by splitting the maximum coding unit may include a part of the input image and a part of the padding area. In this case, a size of a prediction unit or transformation unit included in the coding unit may be determined based on the boundary of the padding area.

In operation 15, the determiner 14 may determine information indicating whether the coding unit included in the padding area includes a nonzero coefficient to be 0. For example, the determiner 14 may determine a coded block flag (CBF) to be 0 regardless of a residual value of the coding unit included in the padding area. In this case, the video encoding apparatus 100 may reduce a rate of the coding unit included in the padding area by not transmitting residual data of the padding area to a decoding apparatus.

Also, the determiner 14 may determine a quantization parameter of the coding unit included in the padding area to be a prediction value. Accordingly, the video encoding apparatus 100 may set a differential value of the quantization parameter to be 0, thereby reducing a data amount transmitted to the video decoding apparatus 200.

Also, the determiner 14 may determine a prediction mode of the coding unit included in the padding area according to a slice type. For example, the determiner 14 may determine the prediction mode to be an intra mode when the slice type is I-type, and to be an inter mode when the slice type is P- or B-type.

Also, the determiner 14 may determine the prediction mode of the coding unit included in the padding unit from among a certain number of prediction mode candidates. For example, when the prediction mode is determined to be an intra mode, the determiner 14 may use a most probable mode (MPM) such that a prediction mode of a current block is determined to be one of prediction modes of adjacent blocks.

Alternatively, the determiner 14 may determine the prediction mode to be a skip mode. At this time, the determiner 14 may determine a merge index of the coding unit included in the padding area to be an index having a lowest value from among indexes respectively indicating merge candidate blocks. Alternatively, the determiner 14 may determine the merge index to be an index indicating a padding direction. Accordingly, the video encoding apparatus 100 does not transmit information related to a motion vector differential value, a prediction direction, and a reference picture index of the coding unit included in the padding area, and thus a data amount transmitted to the video decoding apparatus 200 may be reduced.

In operation 17, the encoder 16 may encode a bitstream including the information determined in operation 15. Here, the information may include at least one of information indicating whether the coding unit includes a nonzero coefficient, information about the partition mode of the coding unit included in the padding area, the differential value of the quantization parameter, information about the prediction mode, and the merge index.

FIG. 2A is a block diagram of the video decoding apparatus 200 according to some embodiments.

The video decoding apparatus 200 according to some embodiments may include a decoder 22, a restored image generator 24, and an image reproducer 26. Also, the video decoding apparatus 200 according to some embodiments may include a central processor (not shown) that generally controls the decoder 22, the restored image generator 24, and the image reproducer 26. Alternatively, the decoder 22, the restored image generator 24, and the image reproducer 26 may be operated by independent processors (not shown), and the video decoding apparatus 200 may operate in general as the independent processors mutually systematically operate. Alternatively, the decoder 22, the restored image generator 24, and the image reproducer 26 may be controlled by an external processor (not shown) of the video decoding apparatus 200 according to some embodiments.

The video decoding apparatus 200 according to some embodiments may include at least one data storage unit (not shown) storing input/output data of the decoder 22, the restored image generator 24, and the image reproducer 26. The video decoding apparatus 200 may include a memory controller (not shown) that manages data input/output of the data storage unit.

The video decoding apparatus 200 according to some embodiments may interwork with an internal video decoding processor or an external video decoding processor to perform a video decoding operation including inverse transformation, thereby restoring a video via video decoding. The internal video decoding processor of the video decoding apparatus 200 according to some embodiments may realize a video decoding operation as a separate processor. Also, the video decoding apparatus 200, a central processing apparatus, or a graphic processing apparatus may realize a basic video decoding operation by including a video decoding processing module.

Operations of the video decoding apparatus 200 according to some embodiments will now be described in detail with reference to FIG. 2B.

FIG. 2B is a flowchart of a video decoding method according to some embodiments.

In operation 21, the decoder 22 may obtain image data and encoding information of a maximum coding unit including a padding area, from a received bitstream. Here, the encoding information may include at least one of information indicating whether a coding unit includes a nonzero coefficient, information about a partition mode of a coding unit included in the padding area, a differential value of a quantization parameter, information about a prediction mode, and a merge index.

In operation 23, the restored image generator 24 may generate a restored image based on the image data and the encoding information of the maximum coding unit.

For example, information indicating whether the coding unit included the padding area from among coding units included in the maximum coding unit includes a nonzero coefficient may be 0. In other words, a CBF may be 0. Accordingly, the restored image generator 24 may determine transformation coefficients of the coding unit included in the padding area to be 0.

Also, the restored image generator 24 may determine a quantization parameter of the coding unit included in the padding area from among the coding units obtained by splitting the maximum coding unit to be a prediction value. Accordingly, the differential value of the quantization parameter obtained by the video decoding apparatus 200 may be 0.

Also, the restored image generator 24 may predict the coding unit included in the padding area according to a prediction mode determined from among a certain number of prediction mode candidates. For example, when the prediction mode of the coding unit included in the padding area is determined to be an intra mode, the restored image generator 24 may perform prediction of a prediction unit by using one of MPMs.

Also, the restored image generator 24 may predict the coding unit included in the padding area to be a skip mode.

Accordingly, the restored image generator 24 may perform prediction of a prediction unit by obtaining information related to a differential value of a motion vector, a prediction direction, and an index of a reference picture from adjacent blocks with respect to the coding unit included in the padding area.

In operation 25, the image reproducer 26 may exclude the padding area from the restored image. For example, the image restorer 26 may obtain information about whether padding is performed on an input image and information about a size of the padding area from an SPS, and determine an image obtained by excluding the padding area from the restored image based on the information about the size of the padding area, as a reproduction image. Accordingly, the image reproducer 26 may reproduce the reproduction image. However, an embodiment is not limited thereto and the image reproducer 26 may remove the padding area from the restored image.

A method of encoding an image including a padding area according to some embodiments will now be described in detail with reference to FIGS. 3 through 7.

FIGS. 3A and 3B illustrate examples of methods of encoding and decoding an image including a padding area, according to some embodiments.

FIG. 3A illustrates a video encoding operation of an image including a padding area, and FIG. 3B illustrates a video decoding operation of an image including a padding area.

First, the video encoding apparatus 100 according to some embodiments may perform padding such that a size of an input image becomes a multiple of a maximum coding unit. Here, information about whether the padding is performed on the input image and a size of a padding area may be transmitted to the video decoding apparatus 200 via an SPS. For example, the SPS may be indicated by a pseudo code below.

conformance_window_flag=true;
    pic_width_in_luma_samples=Orig_width+padding_w
    pic_height_in_luma_samples=Orig_height+padding_h
    conf_win_right_offset=padding_w
    conf_win_bottom_offset=padding_h Here, conformance_window_flag is a flag indicating whether padding is performed on an image, and Orig_width and Orig_height respectively denote a width and a height of an original area 30. Also, padding_w and padding_h respectively denote a width and a height of a padding area 31, and pic_width_in_luma_samples and pic_width_in_luma_samples respectively denote a width and a height of an image including the padding area 31. Also, conf_win_right_offset and conf_win_bottom_offset denote offsets of an area to be excluded when a restored image is reproduced later.

Accordingly, the video decoding apparatus 200 according to some embodiments may restore the image including the padding area 31 while excluding the padding area 31 by obtaining the information about whether padding is performed on the input image and the size of the padding area 31 from the SPS.

FIG. 4 is a flowchart for describing a method of encoding an image, wherein an encoding mode is enforced on a padding area, according to some embodiments.

In operation 40, the video encoding apparatus 100 may perform padding outside an input image such that a size of the input image becomes a multiple of a maximum coding unit. Here, a padding area generated by performing the padding may be filled with a certain value.

For example, FIG. 5 illustrates an example of performing padding outside an image, according to some embodiments.

Referring to FIG. 5, an original area 50 of an input image is not a multiple of a maximum coding unit CTU(0). Accordingly, padding may be performed on maximum coding units CTU(1), CTU(2), and CTU(3) such that the input image becomes a multiple of the maximum coding unit CTU(0). In other words, the video encoding apparatus 100 may fill a padding area 51 with adjacent blocks or pixel values of the original area 50 in a padding direction 52.

Here, the maximum coding units CTU(1) through CTU(3) are each a maximum coding unit including a padding area described later.

Meanwhile, when the video encoding apparatus 100 is to encode an image on which padding is performed, a data amount to be processed may increase and thus coding performance may be decreased. Accordingly, the video encoding apparatus 100 according to some embodiments may enforce an encoding mode of a coding unit included in a padding area in order to decrease a rate of an image including the padding area.

For example, an optimum encoding mode may be pre-calculated based on ratedistortion optimization (RDO) model with respect to a coding unit included in a padding area, and the calculated optimum encoding mode may be enforced on the coding unit included in the padding area.

Referring back to FIG. 4, in operation 41, when a current maximum coding unit includes a padding area generated via the padding, the video encoding apparatus 100 may split the current maximum coding unit by using a boundary between the input image and the padding area.

At this time, a RDO model of the current maximum coding unit including the padding area may be represented by Equation 1 below.

$$J(M)=D(M)+\lambda \cdot R(M), \text{ where } M=\{\text{mode, qp, coeff}\} \quad \text{[Equation 1]}$$

Here, J(M) denotes an RDO model, D(M) denotes deterioration due to quantization, ? denotes a Lagrangian multiplier, and R(M) denotes a compressed stream rate. Also, mode denotes a prediction mode, qp denotes a quantization parameter, and coeff denotes information indicating whether a coding unit includes a nonzero coefficient.

Meanwhile, FIG. 6 illustrates an example of splitting a maximum coding unit by using a boundary between an input image and a padding area, according to some embodiments. Referring to FIG. 6, coding units may be determined by splitting a maximum coding unit into an original area 60 and a padding area 61 based on an image frame boundary 63. Accordingly, rate-distortion cost may be calculated according to a coding unit included in the original area 60 and a coding unit included in the padding area 61.

Also, Equation 1 may be represented in a rate-distortion cost function distinguished into an original area and a padding area as in Equation 2 below.

$$J(M,M')=J_{org}(M)+J_{pad}(M') \quad \text{[Equation 2]}$$

Here, $J_{org}$ denotes a rate-distortion cost value with respect to an encoding mode determined for an original area and $J_{pad}$ denotes a rate-distortion cost value with respect to an encoding mode determined for a padding area.

Moreover, $J_{pad}(M')$ may be represented by Equation 3 below.

$$J_{pad}(M')=D_{pad}(M')+\lambda \cdot R_{pad}(M') \quad \text{[Equation 3]}$$

Here, $D_{pad}(M')$ denotes deterioration due to quantization of a padding area and $R_{pad}(M')$ denotes a compression stream rate of a padding area.

Also, in order to increase coding performance of an image including a padding area based on Equation 3, Equation 4 may be induced.

$$R(M)=R_{org}(M) \rightarrow R_{pad}(M')=0 \quad \text{[Equation 4]}$$

Here, $D_{pad}(M')$ may be ignored since a padding area is excluded whiel measuring a peak signal to noise ratio (PSNR).

As a result, a rate-distortion cost of a padding area may be reduced when an encoding mode M' wherein $R_{pad}(M')$ approaches 0 is determined.

Meanwhile, $R_{pad}(M')$ may be again represented by Equation 5 below.

$$R_{pad}(M')=R_{pad}(\text{mode}')+R_{pad}(\text{qp}')+R_{pad}(\text{coeff}') \quad \text{[Equation 5]}$$

Here, mode' denotes a prediction mode, qp' denotes a quantization parameter, and coeff' denotes a transformation coefficient.

In operation 42, the video encoding apparatus 100 may determine a partition mode of the coding unit included in the padding area. In this case, the video encoding apparatus 100 may decrease $R_{pad}(\text{mode}')$ by restricting split of the coding unit included in the padding area since data related to an index of a reference picture and a differential value of a motion vector may increase in proportion to a number of coding units included in the padding area.

For example, FIG. 7 illustrates an example of determining a partition mode of a coding unit included in a padding area, according to some embodiments.

Referring to FIG. 7, a maximum coding unit 70 may include an original area 71 and a padding area 72. When the padding area 72 included in the maximum coding unit 70 is a multiple of a minimum coding unit, the maximum coding unit 70 may be split such that the original area 71 and the padding area 72 are distinguished from each other.

For example, the original area 71 may be split into four blocks having a size of 16×16. Also, the padding area 72 may be split into four block2 73 having a size of 16×16 and two blocks 74 having a size of 32×32. Here, since the maximum coding unit 70 may be split in a tree structure, the blocks 74 may be further split into four blocks having a size of 16×16 and the blocks 73 may be further split into blocks having a size of 8×8. However, the video encoding apparatus 100 according to some embodiments may decrease $R_{pad}$(mode') by encofcing a coding unit included in the padding area 72 to be no longer split.

Accordingly, a partition mode of a coding unit included in a padding area may be obtained by using Equation 6 below.

$$X=i\times2^6+j\times2^5+k\times2^4, \text{ where } i, j, k=0 \text{ or } 1 \quad \text{[Equation 6]}$$

Here, X denotes a smaller value from among a width and a height of a padding area when the padding area is a multiple of a minimum coding unit. Accordingly, by calculating X according to Equation 6, a size of a coding unit may be determined based on whether i, j, and k are each 0 or 1.

For example, since the padding area 72 has a width smaller than height in FIG. 7, the width, i.e., X may be $2^5+2^4$. Accordingly, $R_{pad}$(mode') may be decreased when a coding unit of the padding area 72 that is split into the four blocks 73 and the two blocks 74 is determined.

Referring back to FIG. 4, in operation 43, the video encoding apparatus 100 may determine information indicating whether the coding unit included in the padding area includes a nonzero coefficient to be 0. For example, the video encoding apparatus 100 may determine a CBF of the coding unit included in the padding area to be 0. As a result, the video encoding apparatus 100 may determine the CBF to be 0 such that $R_{pad}$(coeff') becomes 0.

In operation 44, the video encoding apparatus 100 may determine a quantization parameter of the coding unit included in the padding area to be a prediction value. Accordingly, the video encoding apparatus 100 may set a differential value of the quantization parameter to be 0, thereby setting $R_{pad}$(qp') to be 0.

In operations 45 through 49, the video encoding apparatus 100 may enforce a prediction mode for decreasing $R_{pad}$(mode') to increase encoding efficiency of the padding area.

In operation 45, the video encoding apparatus 100 may determine the prediction mode of the coding unit included in the padding area to be an inter prediction mode or an intra prediction mode according to a slice type. For example, the video encoding apparatus 100 may determine the prediction mode to be an intra prediction mode when a slice type is I-type and to be an inter prediction mode when a slice type is P- or B-type.

Then, the video encoding apparatus 100 determines whether the prediction mode of the coding unit included in the padding area is an intra prediction mode, in operation 46. When the prediction mode is an intra prediction mode, operation 47 is performed and when the prediction mode is an inter prediction mode, operation 48 is performed.

In operation 47, the video encoding apparatus 100 determines the intra prediction mode to be an MPM such that a prediction mode of a current block is determined to be one of prediction modes of adjacent blocks.

In operation 48, the video encoding apparatus 100 may determine the prediction mode of the coding unit included in the padding area to be a skip mode.

Then, in operation 49, the video encoding apparatus 100 may determine a merge index of the coding unit included in the padding area to be an index having a lowest value from among indexes respectively indicating merge candidate blocks. Accordingly, the video encoding apparatus 100 may reduce a data amount transmitted to the video decoding apparatus 200 by not transmitting information related to a differential value of a motion vector, a prediction direction, and an index of a reference picture with respect to the coding unit included in the padding area.

Meanwhile, if the padding area included in the maximum coding unit is not a multiple of a minimum coding unit, a coding unit including only the padding area is unable to be split from the maximum coding unit. For example, a coding unit split from the maximum coding unit may include a part of the input image and a part of the padding area. Accordingly, in this case, a size of a prediction unit or transformation unit included in the coding unit may be determined based on a boundary of the padding area. Accordingly, the embodiments described above may be applied to a transformation unit or prediction unit including a part of the padding area.

Also, in the video encoding apparatus 100 according to some embodiments, when a coding unit includes a part of the input image and a part of the padding area a prediction unit in the coding unit corresponding to the part of the padding area may use a prediction mode of a prediction unit in the coding unit corresponding to the part of the input image.

As described above, the video encoding apparatus 100 and the video decoding apparatus 200 according to some embodiments may enforce an encoding mode while encoding a padding area included in an image to increase compression efficiency.

In addition, operations described above with reference to FIGS. 4 through 7 are performed by the video encoding apparatus 100, but it would be obvious to one of ordinary skill in the art that the same operations may be performed by the video decoding apparatus 200.

As described above, in the video encoding apparatus 100 according to some embodiments and the video decoding apparatus 200 according to some embodiments, blocks obtained by splitting video data may be split into coding units having a tree structure, and coding units, prediction units, and transformation units may be used for inter-layer prediction or inter prediction of the coding units. Video encoding and decoding methods and apparatuses based on coding units having a tree structure and transformation units, according to some embodiments, will now be described with reference to FIGS. 8 through 20.

FIG. 8 is a block diagram of the video encoding apparatus 100 based on a coding unit according to a tree structure, according to some embodiments.

The video encoding apparatus 100 according to an embodiment involving video prediction based on coding units according to a tree structure includes a coding unit determiner 120 and an output unit 130.

The coding unit determiner 120 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to some embodiments may be a data unit having a size of 32×32, 64×64, 128×128, 256×256, etc., wherein a shape of the data unit is a square having a width and length in squares of 2.

A coding unit according to some embodiments may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to some embodiments is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 according to some embodiments may determine coding units having a tree structure included in the maximum coding unit. The 'coding units having a tree structure' according to some embodiments include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to some embodiments is an index related to the number of splitting times from a maximum coding unit to a minimum coding unit. A first maximum depth according to some embodiments may denote the total number of splitting times from the maximum coding unit to the minimum coding unit. A second maximum depth according to some embodiments may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 according to some embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth according to some embodiments, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type according to some embodiments include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to some embodiments may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to some embodiments. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to some embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit/partition, and a transformation unit, according to some embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the current coding unit is encoded, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and at least one piece of split information is determined for a coding unit of a coded depth, at least one piece of split information may be determined for one maximum coding unit. Also, a coded depth of the image data of the maximum coding unit may be different according to locations since the image data is hierarchically split according to depths, and thus information about the coded depth and split information may be set for the image data.

Accordingly, the output unit 130 according to some embodiments may assign encoding information about a corresponding coded depth and an encoding mode to at least one of the coding unit, the prediction unit, and a minimum unit included in the maximum coding unit.

The minimum unit according to some embodiments is a square data unit obtained by splitting the minimum coding unit constituting the lowermost depth by 4. Alternatively, the minimum unit according to some embodiments may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information.

In the video encoding apparatus 100 according to the simplest embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to some embodiments, image compression efficiency may be increased since a coding unit is adjusted while considering characteristics of an image while increasing a maximum size of a coding unit while considering a size of the image.

The video encoding apparatus 100 described above with reference to FIG. 1A may include as many video encoding apparatuses 100 of FIG. 8 as the number of layers in order to encode single layer images per layer of a multi-layer video. For example, a first layer encoder may include one video encoding apparatus 100 of FIG. 8, and a second layer encoder may include as many video encoding apparatus 100 of FIG. 8 as the number of second layers.

When the video encoding apparatus 100 encodes first layer images, the coding unit determiner 120 may determine a prediction unit for inter prediction according to coding units having a tree structure per maximum coding unit, and perform inter prediction per prediction unit.

When the video encoding apparatus 100 encodes second layer images, the coding unit determiner 120 may determine coding units according to a tree structure and prediction units per maximum coding unit, and perform inter prediction per prediction unit.

The video encoding apparatus 100 may encode a luminance difference between a first layer image and a second layer image in order to compensate for the luminance difference. Here, whether to compensate for the luminance difference may be determined based on an encoding mode of a coding unit. For example a luminance difference may be compensated for only for a prediction unit having a size of 2N×2N.

FIG. 9 is a block diagram of the video decoding apparatus 200 based on a coding unit according to a tree structure, according to some embodiment.

The video decoding apparatus 200 according to an embodiment that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 according to an embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, split information according to depths may be extracted as the information about the coded depth.

The information about the coded depth and the split information according to each maximum coding unit extracted by the image data and encoding information extractor 220 is information about a coded depth and split information determined to generate a minimum encoding error when an encoder, such as the video encoding apparatus 100 according to some embodiments, repeatedly performs encoding for each deeper coding unit according to depths according to each maximum coding unit. Accordingly, the video decoding apparatus 200 may reconstruct an image by decoding the image data according to a coded depth and an encoding mode that generates the minimum encoding error.

Since encoding information according to some embodiments about the coded depth and the encoding mode may be assigned to a predetermined data unit from among a corresponding coding unit, a prediction unit, and a minimum unit, the image data and encoding information extractor 220 may extract the information about the coded depth and the split information according to the predetermined data units. If information about a coded depth and split information of a corresponding maximum coding unit is recorded according to predetermined data units, the predetermined data units to which the same information about the coded depth and the split information are assigned may be inferred to be the data units included in the same maximum coding unit.

The image data decoder 230 may reconstruct the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be reconstructed.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The video encoding apparatus 200 described above with reference to FIG. 2A may include as many video encoding apparatuses 200 of FIG. 9 as the number of viewpoints in order to restore first layer images and second layer images by decoding a first layer image stream and a second layer image stream.

When the first layer image stream is received, the image data decoder 230 of the video decoding apparatus 200 may split samples of first layer images extracted from the first layer image stream by the image data and encoding information extractor 220 into coding units according to a tree structure per maximum coding unit. The image data decoder 230 may restore the first layer images by performing motion compensation per prediction unit for inter prediction according to the coding units of the samples of the first layer image.

When the second layer image stream is received, the image data decoder 230 of the video decoding apparatus 200 may split samples of second layer images extracted from the second layer image stream by the image data and encoding information extractor 220 into coding units according to a tree structure pre maximum coding unit. The image data decoder 230 may restore the second layer images by performing motion compensation per prediction unit for inter prediction according to the coding units of the samples of the second layer images.

The image data and encoding information extractor 220 may obtain information related to a luminance error from a bitstream in order to compensate for a luminance difference between the first layer image and the second layer image. Here, whether to compensate for the luminance difference may be determined based on an encoding mode of a coding unit. For example a luminance difference may be compensated for only for a prediction unit having a size of 2N×2N.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum split information received from an encoder.

FIG. 10 is a diagram for describing a concept of coding units according to some embodiments.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

FIG. 11 is a block diagram of an image encoder 400 based on coding units according to some embodiments.

The image encoder 400 according to some embodiments performs operations of the coding unit determiner 120 of the video encoding apparatus 100 to encode image data. In other words, an intra predictor 420 performs intra prediction on coding units in an intra mode, from among a current frame 405, per prediction unit, and an inter predictor 415 performs inter prediction on coding units in an inter mode by using the current image 405 and a reference image obtained by a restored picture buffer 410, per prediction unit. The current picture 405 may be split into maximum coding units, and then the maximum coding units may be sequentially encoded. Here, the encoding may be performed on coding units split in a tree structure from the maximum coding unit.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is restored to residual data in a spatial domain through an inverse quantizer 445 and an inverse transformer 450. The residual data in the spatial domain is added to the prediction data of the coding unit of each mode output from the intra predictor 420 or the inter predictor 415 to be restored as data in a spatial domain of the coding unit of the current image 405. The data in the spatial domain passes through a deblocking unit 455 and a sample adaptive offset (SAO) performer 460 and thus a restored image is generated. The restored image is stored in the restored picture buffer 410. Restored images stored in the restored picture buffer 410 may be used as a reference image for inter prediction of another image. The quantized transformation coefficient obtained through the transformer 425 and the quantizer 430 may be output as a bitstream 440 through an entropy encoder 435.

In order for the image encoder 400 according to some embodiments to be applied in the video encoding apparatus 100, components of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 perform operations based on each coding unit among coding units having a tree structure per maximum coding unit.

Specifically, the intra predictor 420 and the inter predictor 415 determine partitions and a prediction mode of each coding unit from among the coding units having a tree structure while considering the maximum size and the maximum depth of a current maximum coding unit, and the transformer 425 may determine whether to split a transformation unit according to a quad-tree in each coding unit from among the coding units having the tree structure.

FIG. 12 is a block diagram of an image decoder 500 based on coding units according to some embodiments.

An entropy decoder 515 parses encoded image data that is to be decoded and encoding information required for decoding from a bitstream 505. The encoded image data is a quantized transformation coefficient, and an inverse quantizer 520 and an inverse transformer 525 restores residual data from the quantized transformation coefficient.

An intra predictor 540 performs intra prediction on a coding unit in an intra mode according to prediction units. An inter predictor performs inter prediction on a coding unit in an inter mode from a current image according to prediction units, by using a reference image obtained by a restored picture buffer 530.

Data in a spatial domain of coding units of the current image is restored by adding the residual data and the prediction data of a coding unit of each mode through the intra predictor and the inter predictor 535, and the data in the spatial domain may be output as a restored image through a deblocking unit 545 and an SAO performer 550. Also, restored images stored in the restored picture buffer 530 may be output as reference images.

In order to decode the image data in the image data decoder 230 of the video decoding apparatus 200, operations after the entropy decoder 515 of the image decoder 500 according to some embodiments may be performed.

In order for the image decoder 500 to be applied in the video decoding apparatus 200 according to some embodiments, components of the image decoder 500, i.e., the entropy decoder 515, the inverse quantizer 520, the inverse transformer 525, the intra predictor 540, the inter predictor 535, the deblocking unit 545, and the SAO performer 550 may perform operations based on coding units having a tree structure for each maximum coding unit.

Specifically, the intra prediction 540 and the inter predictor 535 determine a partition mode and a prediction mode according to each of coding units having a tree structure, and the inverse transformer 525 may determine whether to split a transformation unit according to a quad-tree structure per coding unit.

An encoding operation of FIG. 11 and a decoding operation of FIG. 12 are respectively a video stream encoding operation and a video stream decoding operation in a single layer. Accordingly, when the encoder 16 of FIG. 1A encodes a video stream of at least two layers, the video encoding apparatus 100 of FIG. 1A may include as many image encoder 400 as the number of layers. Similarly, when the decoder 22 of FIG. 2A decodes a video stream of at least two layers, the video decoding apparatus 200 of FIG. 2A may include as many image decoders 500 as the number of layers.

FIG. 13 is a diagram illustrating deeper coding units according to depths, and partitions according to some embodiments.

The video encoding apparatus 100 according to some embodiments and the video decoding apparatus 200 according to some embodiments use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to some embodiments, the maximum height and the maximum width of the coding units are each 64, and the maximum depth is 3. In this case, the maximum depth refers to a total number of times the coding unit is split from the maximum coding unit to the minimum coding unit. Since a depth deepens along a vertical axis of the hierarchical structure 600 of coding units according to some embodiments, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 according to some embodiments performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 14 is a diagram for describing a relationship between a coding unit 710 and transformation units 720, according to some embodiments.

The video encoding apparatus 100 according to some embodiments or the video decoding apparatus 200 according to some embodiments encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 according to some embodiments or the video decoding apparatus 200 according some embodiments, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 is a diagram for describing encoding information of coding units corresponding to a coded depth, according to some embodiments.

The output unit 130 of the video encoding apparatus 100 according to some embodiments may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 according to some embodiments may extract and use the information 800, 810, and 820 for decoding, according to each deeper coding unit.

FIG. 16 is a diagram of deeper coding units according to depths, according to some embodiments.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d, split information for a coding unit 952 having a depth of d−1 is not set.

A data unit 999 may be a 'minimum unit' for the current maximum coding unit. A minimum unit according to some embodiments may be a square data unit obtained by splitting a minimum coding unit having a lowermost coded depth by 4. By performing the encoding repeatedly, the video encoding apparatus 100 according to some embodiments may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 according to some embodiments may extract and use the information about the coded depth and the prediction unit of the coding unit 900 to decode the partition 912. The video decoding apparatus 200 according to some embodiments may determine a depth, in which split information is 0, as a coded depth by using split information according to depths, and use information about an encoding mode of the corresponding depth for decoding.

FIGS. 17 through 19 are diagrams for describing a relationship between coding units 1010, prediction units 1060, and transformation units 1070, according to some embodiments.

The coding units 1010 are coding units having a tree structure, corresponding to coded depths determined by the video encoding apparatus 100 according to some embodiments, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 according to some embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200 according to some embodiments.

may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

TABLE 1

Split Information 0
(Encoding on Coding Unit having Size of 2N × 2N and Current Depth of d)

| Prediction Mode | Partition Type | | Size of Transformation Unit | | Split Information 1 |
| --- | --- | --- | --- | --- | --- |
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 according to some embodiments may output the encoding information about the coding units having a tree structure, and the image data and encoding information extractor 220 of the video decoding apparatus 200 according to some embodiments may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode The encoding information about coding units having a tree structure, according to some embodiments, may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

FIG. 20 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag according to an embodiment is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to some embodiments, together with a maximum size and minimum size of the transformation unit. The video encoding apparatus 100 according to some embodiments is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 according to some embodiments may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to some embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each maximum coding unit to reconstruct image data of a spatial region.

Thus, a picture and a video that is a picture sequence may be reconstructed. The reconstructed video may be reproduced by a reproducing apparatus, stored in a storage medium, or transmitted through a network.

The embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the inter-layer video encoding method and/or the video encoding method described above with reference to FIGS. 1A through 20 will be collectively referred to as a 'video encoding method according to the present invention'. In addition, the inter-layer video decoding method and/or the video decoding method described above with reference to FIGS. 1A through 20 will be referred to as a 'video decoding method according to the present invention'.

Also, the video decoding apparatus 100 or the image encoder 400, which has been described with reference to FIGS. 1A through 20, will be referred to as a 'video encoding apparatus according to the present invention'. In addition, the video decoding apparatus 200 or the image decoder 500, which has been descried with reference to FIGS. 1A through 20, will be referred to as a 'video decoding apparatus according to the present invention'.

A computer-readable recording medium storing a program, e.g., a disc 26000, according to some embodiments will now be described in detail.

FIG. 21 is a diagram of a physical structure of the disc 26000 in which a program is stored, according to some embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to the embodiments, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 22.

FIG. 22 is a diagram of a disc drive 26800 for recording and reading a program by using the disc 26000. A computer system 27000 may store a program that executes at least one of a video encoding method and a video decoding method according to the present invention, in the disc 26000 via the disc drive 26800. To run the program stored in the disc 26000 in the computer system 27000, the program may be read from the disc 26000 and be transmitted to the computer system 26700 by using the disc drive 27000.

The program that executes at least one of a video encoding method and a video decoding method according to the present invention may be stored not only in the disc 26000 illustrated in FIG. 21 or 22 but also in a memory card, a ROM cassette, or a solid state drive (SSD).

A system to which the video encoding method and a video decoding method described above are applied will be described below.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 according to some embodiments may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to the present invention.

The mobile phone 12500 included in the content supply system 11000 according to an embodiment will now be described in greater detail with referring to FIGS. 24 and 25.

FIG. 24 illustrates an external structure of the mobile phone 12500 to which a video encoding method and a video decoding method are applied, according to an embodiment of the present invention. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500, according to an embodiment. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain reconstructed video data and provide the reconstructed video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to the present invention, may be a transceiving terminal including only the video encoding apparatus, or may be a transceiving terminal including only the video decoding apparatus.

A communication system according to an embodiment is not limited to the communication system described above with reference to FIG. 24. For example, FIG. 26 illustrates a digital broadcasting system employing a communication system, according to some embodiments. The digital broadcasting system of FIG. 26 may receive a digital broadcast transmitted via a satellite or a terrestrial network by using a video encoding apparatus and a video decoding apparatus according to the present invention.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to the present invention is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to the present invention may be installed. Data output from the set-top box 12870 may also be reproduced on a TV monitor 12880.

As another example, a video decoding apparatus according to the present invention may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus according to the present invention and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to the present invention, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not be included in the camera 12530, the camera interface 12630, and the image encoding unit 12720 of FIG. 26.

FIG. 27 illustrates a network structure of a cloud computing system using a video encoding apparatus and a video decoding apparatus, according to some embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A to 20. As another example, the user terminal may include a video encoding apparatus as described above with reference to FIGS. 1A to 20. Alternatively, the user terminal may include both the video decoding apparatus and the video encoding apparatus as described above with reference to FIGS. 1A to 20.

Various applications of a video encoding method, a video decoding method, a video encoding apparatus, and a video decoding apparatus according to embodiments of the present invention described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device, according to various embodiments of the present invention, are not limited to the embodiments described above with reference to FIGS. 21 to 27.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

The invention claimed is:

1. A video encoding method comprising:
 performing padding outside an input image, wherein a size of the input image after the padding is performed is a multiple of a maximum coding unit;
 when a current maximum coding unit comprises a padding area generated via the padding, splitting the current maximum coding unit into at least a coding unit by using a boundary between the input image and the padding area;
 assigning a value of 0 to a flag that indicates whether the coding unit included in the padding area has a nonzero coefficient; and
 encoding a bitstream comprising the flag.

2. The video encoding method of claim 1, wherein the determining of the coding unit comprises determining a partition mode such that the coding unit included in the padding area is no longer split.

3. The video encoding method of claim 1, further comprising determining a quantization parameter of the coding unit included in the padding area to be a prediction value.

4. The video encoding method of claim 1, further comprising determining a prediction mode of the coding unit included in the padding area according to a slice type.

5. The video encoding method of claim 4, wherein the determining of the prediction mode comprises determining the prediction mode to be a skip mode.

6. The video encoding method of claim 1, further comprising, when the determined coding unit comprises a part of the input image and a part of the padding area, determining information indicating whether a transformation unit comprising the part of the padding area has a nonzero coefficient to be 0.

7. The video encoding method of claim 6, further comprising, when the determined coding unit comprises the part of the input image and the part of the padding area, determining a prediction mode of a prediction unit comprising the part of the padding area from among prediction units included in the determined coding unit, according to a slice type.

8. A video decoding method comprising:
 obtaining image data and encoding information of a maximum coding unit comprising a padding area, from a received bitstream, the maximum coding unit having been split into at least a coding unit by using a boundary between an input image and the padding area;
 generating a restored image based on the image data and the encoding information of the maximum coding unit; and
 excluding the padding area from the restored image,
 wherein the encoding information includes a flag, which indicates whether the coding unit included in the padding area of the maximum coding unit has a nonzero coefficient, having a value of 0.

9. The video decoding method of claim 8, wherein the generating of the restored image comprises determining a quantization parameter of the coding unit included in the padding area from among coding units included in the maximum coding unit to be a prediction value.

10. The video decoding method of claim 8, wherein the obtaining of the image data and the encoding information comprises obtaining information about the padding area, and
the excluding of the padding area comprises determining an image obtained by excluding the padding area from the restored image based on the information about the padding area to be a reproduction image.

11. The video decoding method of claim 8, wherein the generating of the restored image comprises predicting the coding unit included in the padding area according to a prediction mode determined from among a certain number of prediction mode candidates.

12. The video decoding method of claim 8, wherein the generating of the restored image comprises performing prediction of the coding unit included in the padding area in a skip mode.

13. The video decoding method of claim 12, wherein the generating of the restored image comprises predicting the coding unit included in the padding area according to a merge index indicating a padding direction of the padding area.

14. The video decoding method of claim 12, wherein the generating of the restored image comprises predicting the coding unit included in the padding area according to a merge index determined to be an index having a lowest value from among indexes respectively indicating merge candidate blocks.

15. A video decoding apparatus comprising:
a decoder configured to obtain image data and encoding information of a maximum coding unit comprising a padding area, from a received bitstream, the maximum coding unit having been split into at least a coding unit by using a boundary between an input image and the padding area;
a restored image generator configured to generate a restored image based on the image data and the encoding information of the maximum coding unit; and
an image reproducer configured to exclude the padding area from the restored image,
wherein the encoding information includes a flag, which indicates whether the coding unit included in the padding area of the maximum coding unit has a nonzero coefficient, having a value of 0.

* * * * *